United States Patent [19]
Konno et al.

[11] Patent Number: 5,325,137
[45] Date of Patent: Jun. 28, 1994

[54] OVERHEAD PROJECTOR WITH A SPATIAL LIGHT MODULATOR

[75] Inventors: Toshio Konno, Tokyo; Shintaro Nakagaki, Miura; Ichiro Negishi; Tetsuji Suzuki, both of Yokosuka; Fujiko Tatsumi, Yokohama; Ryusaku Takahashi, Yokosuka, all of Japan

[73] Assignee: Victor Company of Japan, Ltd., Yokohama, Japan

[21] Appl. No.: 935,946

[22] Filed: Aug. 27, 1992

[30] Foreign Application Priority Data

Aug. 28, 1991 [JP] Japan .................................. 3-242650
Nov. 12, 1991 [JP] Japan .................................. 3-323761

[51] Int. Cl.⁵ .............................................. G03B 21/28
[52] U.S. Cl. ........................................ 353/63; 353/98; 353/122; 353/DIG. 3; 359/72
[58] Field of Search .......... 353/122, DIG. 3, DIG. 4, 353/98, 30, 31, 33, 34, 37, 63, 64, 65, 66; 359/38, 40, 71, 72, 70, 62, 48

[56] References Cited

U.S. PATENT DOCUMENTS

| | | | |
|---|---|---|---|
| 4,018,509 | 4/1977 | Boswell et al. | 359/72 |
| 4,127,322 | 11/1978 | Jacobson et al. | 353/37 |
| 5,054,892 | 10/1991 | Takanashi et al. | 359/72 |
| 5,085,498 | 2/1992 | Yamamoto et al. | 359/70 |
| 5,124,545 | 6/1992 | Takanashi et al. | 359/72 |
| 5,130,826 | 7/1992 | Takanashi et al. | 359/72 |
| 5,132,814 | 7/1992 | Ohkouchi et al. | 353/72 |
| 5,214,457 | 5/1993 | Takanashi et al. | 353/31 |

FOREIGN PATENT DOCUMENTS 317615 1/1991 Japan .

Primary Examiner—William A. Cuchlinski, Jr.
Assistant Examiner—William C. Dowling
Attorney, Agent, or Firm—Lowe, Price, LeBlanc & Becker

[57] ABSTRACT

An overhead projector for irradiating a spatial light modulator with reading light to read out a subject image written in the spatial light modulator with writing light and projecting the subject image read out with the reading light, wherein the spatial light modulator consists of photoconductive layer for receiving the writing light coming from a subject to reproduce the subject image, light modulating layer formed by a liquid crystal of which molecules are arranged in a homeotropic orientation for modulating the reading light of which a waveband is limited to a prescribed range according to the subject image reproduced in the photoconductive layer, and a dielectric mirror having wavelength selectivity for reflecting the reading light with the waveband modulated by the light modulating layer.

15 Claims, 11 Drawing Sheets

OVERHEAD PROJECTOR WITH A SPATIAL LIGHT MODULATOR

BACKGROUND OF THE INVENTION

1. Field of the Invention

The present invention relates to an overhead projector with a spatial light modulator, and, in particular, to an overhead projector with a spatial light modulator in which a superior contrast between light and shade is obtained.

2. Description of the Related Art

2.1. Previously Proposed Art

As is well known, an overhead projector has been conventionally utilized to project only a manuscript drawn in a film type of transparent manuscript paper onto a screen. However, an overhead projector utilizing a spatial light modulator has been laid open to public inspection under Japanese Patent Provisional Publication No. 17615/1991 (HEI 3-17615). The overhead projector with a spatial light modulator is utilized to project a manuscript drawn in an opaque film.

In detail, as shown in FIG. 1, a manuscript drawn in an opaque film 11 is illuminated with writing light Lw before the writing light Lw is reflected by the opaque film 11. In this case, because large pieces of writing light Lw are respectively absorbed according to the manuscript to for the image of the manuscript, the intensities of the large pieces of writing light Lw are varied according to the manuscript. Thereafter, one side of a light valve 12 with a liquid crystal are irradiated with the writing light Lw reflected by the opaque film 11 to write the image of the manuscript in the light valve 12. Here, the light value 12 functions as the spatial light modulator. That is, the light valve 12 consists of a large number of regions, and each region is irradiated with prescribed pieces of writing light Lw.

Thereafter, the other side of the light valve 12 is irradiated with visible reading light Lr to read out the image of the manuscript from the light valve 12. That is, large pieces of visible reading light Lr are modulated in the light valve 12 for each region according to the manuscript written in the light valve 12, and the visible reading light Lr reflected by the light valve 12 is projected onto a screen 13.

The light valve 12 with a liquid crystal comprises layers of a photoconductive layer 14 for receiving the writing light Lw reflected by the opaque film 11, a reflecting layer 15 for reflecting the visible reading light Lr, and a liquid crystal layer 16 for modulating the visible reading light Lr, in that order. In addition, the photoconductive layer 14 consists of a large number of regions, the reflecting layer 15 consists of a large number of regions, and the liquid crystal layer 16 consists of a large number of regions. Each of the regions of the photoconductive layer 14, each of the regions of the reflecting layer 15 and each of the regions of the liquid crystal layer 16 are in alignment with one another.

In the above configuration, when the photoconductive layer 14 is irradiated with the writing light Lw, an electrical resistivity of the photoconductive layer 14 is lowered for each region of the photoconductive layer 14 in proportion to the intensity of the writing light Lw. That is, the manuscript drawn in the opaque film 11 is written in the photoconductive layer 14 as image information. Therefore, in cases where a prescribed electric potential difference is applied between the photoconductive layer 14 and the liquid crystal layer 16, voltages applied to the regions of the liquid crystal layer 16 are increased in proportion to electrical resistivities of the regions of the photoconductive layer 14. Therefore, the image information of the manuscript written in the photoconductive layer 14 is transferred to the liquid crystal layer 16 as a voltage distribution of the liquid crystal layer 16.

Thereafter, when the liquid crystal layer 16 is irradiated with the visible reading light Lr, the visible reading light Lr is modulated in the liquid crystal layer 16 according to the voltage distribution of the liquid crystal layer 16. That is, large pieces of visible reading light Lr are polarized in the liquid crystal layer 16 according to a double refraction phenomenon for each region of the liquid crystal layer 16. Thereafter, the visible reading light Lr is reflected by the reflecting layer 15 to pass through the liquid crystal layer 16 once more. Thereafter, the intensities of the large piece of visible reading light Lr are varied by a polarizer for each region because the light Lr is poralized in the liquid crystal layer 16. This means that the image information of the manuscript transferred in the liquid crystal layer 16 is read out by the visible reading light Lr because an intensity distribution of the large pieces of visible reading light Lr depends on the manuscript. Thereafter, the image information read out by the visible reading light Lr is enlarged by a prescribed optical system 17 before the image information is projected onto the screen 13.

Accordingly, the manuscript drawn in the opaque film 11 can be enlarged and be reproduced onto the screen 13.

2.2 PROBLEMS TO BE SOLVED BY THE INVENTION:

However, in cases where a part of the visible reading light Lr penetrates the reflecting layer 15 of the spatial light modulator such as the light valve 12 with a liquid crystal, the photoconductive layer 14 is optically reacted by the part of the visible reading light Lr so that the electrical resistivity of the photoconductive layer 14 receiving the visible reading light Lr is varied. Therefore, the image of the manuscript projected onto the screen 13 becomes unclear. In other words, the contrast of the image projected onto the screen 13 deteriorates.

Moreover, in general, the liquid crystal layer 16 is easily irradiated with the visible reading light Lr with a high intensity to project a bright image of the manuscript onto the screen 13. Therefore, the quantity of the visible reading light Lr penetrating the reflecting layer 15 is further increased. As a result, the contrast of the image projected onto the screen 13 increasingly deteriorates.

Therefore, the overhead projector with the spatial light modulator is further provided with a shading layer 18 between the photoconductive layer 14 and the reflecting layer 15 to improve the contrast of the image by shading the visible reading light Lr penetrating the reflecting layer 15. However, the resolution of the image projected onto the screen 13 deteriorates because the shading layer 18 prevents the image of the manuscript from being transferred from the photoconductive layer 14 to the liquid crystal layer 16. The deterioration of the resolution is increased as the thickness of the shading layer 18 becomes thick. Therefore, it can be considered that shading properties of the shading layer 18 are raised to make the thickness of the shading layer 18 thin. However, the electrical impedance of the shading layer 18 is lowered as the thickness of the shading layer 18 becomes thin. In this case, an electric field generated in one region is spread over the other regions. Therefore, the resolution of the image deteriorates.

In addition, the liquid crystal layer 16 of the light valve 12 is generally formed by a liquid crystal with a homogeneous orientation because the homogeneously oriented liquid crystal layer 16 functions at a low electric voltage and is easy to deal with. However, the intensity of the reading light Lr modulated in the liquid crystal layer 16 largely depends on the wavelength of the reading light Lr. The reason why the intensity of the modulated reading light Lr largely depends on the light wavelength is described with reference to FIGS. 2, 3.

As shown in FIG. 2, a double refractive index $\Delta n$ of a liquid crystal depends on a wavelength $\lambda$ of light. In cases where the liquid crystal is sandwiched between a pair of polarizers of which the polarizing directions are crossed each other, an intensity $I_o$ of the light is reduced to an intensity $I_t$ after the light is transmitted through one polarizer, the liquid crystal, and the other polarizer in that order. That is, following equations are satisfied $$I_t = I_o \cdot \sin^2(\pi R/\lambda)$$

$$R = d \cdot \Delta n(\lambda) \cdot \cos^2\phi(V),$$

where the symbol d represents the thickness of the liquid crystal and the symbol $\phi(V)$ represents the inclined angle of molecules in the liquid crystal. The value of the angle $\phi(V)$ depends on a voltage V applied to the liquid crystal.

In this case, the condition that the intensity $I_t$ of the transmitted light is at a maximum is as follows.

$$\cos^2\phi(V_p) = \lambda_p / \{d \cdot \Delta n(\lambda_p)\} \cdot (m + \tfrac{1}{2}) \quad m = 0, 1, 2,.$$

That is, when the voltage $V_p$ is applied to the liquid crystal, the intensity $I_t$ of the transmitted light with the wavelength $\lambda_p$ equals $I_o$.

When the liquid crystal is irradiated with large pieces of light with a waveband, the intensities $I_t$ of the large pieces of transmitted light are varied for each light wavelength as shown in FIG. 3. That is, the transmitted light intensities $I_t$ are reduced as the value m becomes high.

In cases where the electric potential $V_p$ is applied to the homogeneously oriented liquid crystal layer 16 for practical use, the value m equals 3 or 4 as is well known. Therefore, the intensity $I_t$ of the transmitted light is largely varied as compared with the case that the value m equals 0 or 1.

Therefore, the contrast of the image deteriorates unless the waveband of the reading light is extremely narrowed. Moreover, in cases where the waveband of the reading light is narrowed to avoid the deterioration of the contrast, the luminance of the image projected onto the screen 13 is decreased because the intensity of the light transmitted to the liquid crystal layer 16 is lowered. Specially, it is very difficult to obtain a colored image of a colorful subject at a high luminance onto the screen 13 while maintaining the reproductivity of the color.

In addition, the light valve 12 with a liquid crystal is merely applied to an overhead projector without any modification. Therefore, it is not considered how to conveniently utilize the light valve 12. For example, a three-dimensional subject cannot be projected onto the screen 13.

SUMMARY OF THE INVENTION

A first object of the present invention is to provide, with due consideration to the drawbacks of such conventional overhead projectors, an overhead projector with a spatial light modulator in which the image with superior contrast and resolution is projected onto a screen.

A second object of the present invention is to provide an overhead projector with a spatial light modulator in which many types of subjects such as a script drawn in a transparent film, a script drawn in an opaque film, a publication, and a three-dimensional subject are reproduced onto a screen.

A third object of the present invention is to provide an overhead projector with a spatial light modulator in which a colored image is projected onto a screen at high luminance while maintaining the reproductivity of the color.

The first, second and third objects are achieved by the provision of an overhead projector OP1 for irradiating a spatial light modulator with reading light to read out a subject image written in the spatial light modulator with writing light and projecting the subject image read out with the reading light, wherein the spatial light modulator comprises:

image reproducing means for receiving the writing light coming from a subject to reproduce the subject image;

light modulating means for modulating the reading light of which a waveband is limited to a prescribed range according to the subject image reproduced in the image reproducing means, the light modulating means being formed by a liquid crystal of which molecules are arranged in a homeotropic orientation; and a dielectric mirror having wavelength selectivity for reflecting the reading light with the waveband modulated by the light modulating means, the reading light reflected by the dielectric mirror being projected onto a screen.

In the above configuration, a subject image is reproduced in the image reproducing means by some means or other. Thereafter, when the light modulating means is irradiated with reading light, the reading light is modulated by the light modulating means according to the subject image reproduced in the image reproducing means. For example, the reading light is optically rotated by the modulation in the light modulating means.

In general, in cases where the reading light is modulated by the light modulating means, the degree of the modulation depends on the wavelength of the reading light. Therefore, the reading light cannot be accurately modulated according to the subject image reproduced in the image reproducing means because the reading light has a prescribed waveband.

However, in the present invention, because the light modulating means is formed by a liquid crystal of which molecules are arranged in a homeotropic orientation, the degree of the modulation is independent of the wavelength of the reading light. Therefore, the reading light is accurately modulated according to the subject image reproduced in the image reproducing means, even though the reading light has a prescribed waveband.

In addition, because the waveband of the reading light is limited to a prescribed range, the dielectric mirror is not required to reflect the reading light of which the waveband is out of the prescribed range. Therefore, even though the dielectric mirror is thin, the reading light is selectively reflected by the dielectric mirror at a high possibility. For example, in cases where the dielectric mirror comprises a limited number of layers alternately laid by a silicon layer, silicon dioxide layer and a titanium dioxide layer, the transmittance of the reading light penetrating the dielectric mirror is reduced to less than $10^{-4}$.

Moreover, because the reading light is prevented from penetrating the dielectric mirror, the subject image reproduced in the image reproducing means is not adversely affected by the reading light.

Accordingly, the subject image with superior contrast and resolution can be projected onto a screen because the light modulating means is formed by a liquid crystal with the homeotropic orientation and the reading light is selectively reflected by the dielectric mirror.

It is preferred that the overhead projector OP1 further comprise source light generating means for generating source light and waveband limiting means for limiting the waveband of the source light generated by the source light generating means to the prescribed range to make reading light.

In the above configuration, the spatial light modulator is irradiated with the reading light of which the waveband is limited to the prescribed range by the waveband limiting means.

Also, it is preferred that the overhead projector OP1 further comprise writing light generating means for generating the writing light and optical system means for illuminating the subject with the writing light generated by the writing light generating means to form the subject image and irradiating the image reproducing means with the writing light coming from the subject to write the subject image in the image reproducing means.

In the above configuration, the subject image is written in the spatial light modulator.

In addition, it is preferred that the optical system means of the overhead projector OP1 comprise writing light reflecting means for reflecting the writing light passing through the subject towards the image reproducing means.

In the above configuration, not only a subject drawn in an opaque film but also a subject drawn in the transparent film are reproduced onto the screen because the writing light passing through the subject drawn in the transparent film is reflected by the writing light reflecting means towards the image reproducing means.

Accordingly, many types of subjects such as the script drawn in the transparent film and the script drawn in the opaque film can be reproduced onto the screen. That is, the second object is achieved.

In the same manner, it is preferred that the optical system means of the overhead projector OP1 comprise focus adjusting means for adjusting the focus of the optical system means to compensate the thickness of the subject.

In the above configuration, not only a subject drawn in an opaque film but also a three-dimensional subject are reproduced onto the screen because the influence of the thickness of the subject on the focus of the writing light is compensated by the focus adjusting means.

Accordingly, many types of subjects such as the script drawn in the opaque film, a publication, and the three-dimensional subject are reproduced in focus onto the screen. That is, the second object is achieved.

Also, it is preferred that the overhead projector OP1 further comprise writing light generating means for generating the writing light, optical system means for illuminating the subject drawn in a transparent manuscript with the writing light generated by the writing light generating means to form the subject image and irradiating the image reproducing means with the writing light penetrating the transparent manuscript to write the subject image in the image reproducing means, light adjusting means for adjusting intensity of the writing light generated by the writing light generating means according to density of the subject, and sensitivity adjusting means for adjusting sensitivity of the image reproducing means according to the intensity of the writing light irradiating the image reproducing means.

In the above configuration, the subject drawn in a transparent manuscript is written in the image reproducing means. In addition, the intensity of the writing light is adjusted according to density of the subject. Further, the sensitivity of the image reproducing means is adjusted according to the intensity of the writing light.

Accordingly, even thought the intensity of the writing light generated by the writing light generating means is too high, the image reproducing means can be adequately irradiated with the writing light.

Moreover, it is preferred that the overhead projector OP1 further comprise:

source light generating means for generating source light;

waveband limiting means for limiting the waveband of the source light generated by the source light generating means to the prescribed range;

light splitting means for splitting the source light of which the waveband is limited by the waveband limiting means into two portions, (1) the two portions of the source light being perpendicularly polarized light to the place of incidence and parallel polarized light to the place of incidence, and (2) the light modulating means being irradiated with one of the two portions of the source light; and optical system means for illuminating the subject with the other portion of the source light to form the subject image and irradiating the image reproducing means with the other portion of the source light coming from the subject to reproduce the subject image in the image reproducing means.

In the above configuration, a subject is illuminated with the other portion of the reading light, while the subject is generally illuminated with writing light.

Therefore, the electric power of the reading light can be effectively utilized because the writing light is not required to illuminate the subject.

Moreover, it is preferred that the overhead projector OP1 further comprise:

a transparent subject stand for putting the subject drawn in a transparent film;

flat light generating means arranged just under the transparent subject stand for generating flat light, the flat light penetrating the transparent film put on the transparent subject stand to write the subject image in the image reproducing means; and light adjusting means for adjusting intensity of the flat light generated by the flat light generating means.

In the above configuration, the subject drawn in a transparent film is illuminated by the flat light to write the subject image in the image reproducing means. In addition, the intensity of the flat light is adjusted by the light adjusting means.

Accordingly, the image of the subject drawn in the transparent film can be adequately reproduced in the image reproducing means.

Further, it is preferred that the overhead projector further OP1 comprise:

writing light generating means for sequentially generating three primary color lights one after another in prescribed order, each of the three primary color lights being utilized as the writing light;

first optical system means for sequentially illuminating the subject with the three primary color lights generated by the writing light generating means one after another in the prescribed order, the subject image being formed by the illumination of the subject with each of the three primary color lights;

reading light generating means for sequentially generating three primary color lights one after another in the prescribed order in synchronism with the writing light generating means, each of the three primary color lights being utilized as the reading light; and second optical system means for sequentially irradiating the light modulating means with the three primary color lights generated by the reading light generating means one after another in the prescribed order to read out the subject image and projecting the subject image onto the screen.

In the above configuration, primary color lights are sequentially generated one after another in both the writing light generating means and the reading light generating means in synchronism with each other. That is, a subject is sequentially illuminated with each of the primary color lights one after another before the image reproducing means is irradiated with the primary color lights to write monochromatic subject image formed by the illumination of the primary color lights in the image reproducing means. Thereafter, the light modulating means is sequentially irradiated with the primary color lights one after another to read out the subject image.

Therefore, in cases where the monochromatic subject images read out by primary color lights are sequentially projected on the screen one after another, an audience regards the monochromatic subject images as a colored image.

Accordingly, the third object is achieved because the colored image can be projected.

The third object is also achieved by the provision of an overhead projector OP2 for projecting a colored subject image, comprises:

writing light generating means for generating writing light of which a waveband ranges over three primary colors;

first optical system means for illuminating a subject with the writing light generated by the writing light generating means;

writing light separation means for separating the writing light with which the subject is illuminated by the first optical system means to three primary color components of the writing light;

reading light generating means for generating reading light of which a waveband ranges over three primary colors;

reading light separation means for separating the reading light generated by the reading light generating means to three primary color components of the reading light, each of the three primary color components being in a prescribed range;

three types of spatial light modulators for receiving respective primary color components of the writing light and respective primary color components of the reading light with a one-to-one correspondence, each of the spatial light modulators comprising (1) image reproducing means for receiving one of three primary color components of the writing light separated by the writing light separation means to reproduce a monochromatic subject image, (2) light modulating means for modulating the same primary color component of the reading light separated by the reading light separation means as that of the writing light received by the image reproducing means according to the subject image reproduced in the image reproducing means, the light modulating means being formed by a liquid crystal of which molecules are arranged in a homeotropic orientation, and (3) dielectric reflecting means for selectively reflecting the primary color component of the reading light modulated by the light modulating means to read out the monochromatic subject image;

reading light composition means for composing the three primary color components of the reading light respectively reflected by the dielectric reflecting means of the spatial light modulators, the colored subject image being formed by composition of the monochromatic subject images; and second optical system means for projecting the colored subject image formed by the reading light composition means onto a screen.

In the above configuration, three types of spatial light modulators correspond to the respective red, green and blue light components. That is, a subject is illuminated with writing light before the writing light is separated to red, green and blue light components of the writing light by the writing light separation means. Thereafter, for example, the spatial light modulator corresponding to the red light component is irradiated with the red light component of the writing light to write a subject image formed by the red light component.

Thereafter, reading light is separated to red, green and blue light components of the reading light by the reading light separation means. The spatial light modulator corresponding to the red light component is irradiated with the red light component of the reading light to read out the subject image.

In the same manner, a subject image formed by the green light component of the writing light is read out from the spatial light modulator corresponding to the green light component by the green light component of the reading light. Also, a subject image formed by the blue light component of the writing light is read out from the spatial light modulator corresponding to the blue light component by the blue light component of the reading light.

Thereafter, the red, green and blue light components of the reading light are composed by the reading light composition means. Therefore, three types of subject images are composed to form a colored subject image. The colored subject image is projected onto a screen by the second optical system means.

Accordingly, the colored image can be projected.

In addition, because each of the light modulating means of the spatial light modulators is formed by a liquid crystal of which molecules are arranged in a homeotropic orientation, the degree of the modulation is independent of the wavelength of the three primary color components of the reading light. Therefore, the three primary color components of the reading light are accurately modulated according to the respective subject images reproduced in the image reproducing means, even though each of the three primary color components of the reading light has a prescribed waveband.

In addition, because each of the wavebands of the three primary color components of the reading light is in a prescribed range, each of the dielectric mirrors of the spatial light modulators is not required to reflect the corresponding primary color component of the reading light of which the waveband is out of the prescribed range. Therefore, even though each of the dielectric mirrors is thin, the primary color components of the reading light are selectively reflected by the dielectric mirrors at a high possibility. Moreover, because the primary color components of the reading light are prevented from penetrating the dielectric mirrors, the subject image reproduced in the image reproducing means is not adversely affected by the primary color components of the reading light.

Accordingly, the subject image with superior contrast and resolution can be projected onto a screen because the light modulating means is formed by a liquid crystal with the homeotropic orientation, and the primary color components of the reading light can be selectively reflected by the dielectric reflecting means.

DETAIL DESCRIPTION OF THE PREFERRED EMBODIMENTS

Hereinafter, an overhead projector with a spatial light modulator according to the present invention is described in detail with reference to accompanied drawings.

1. First embodiment:

A first embodiment according to the present invention is first described with reference to FIGS. 4 to 6.

Figure 4:
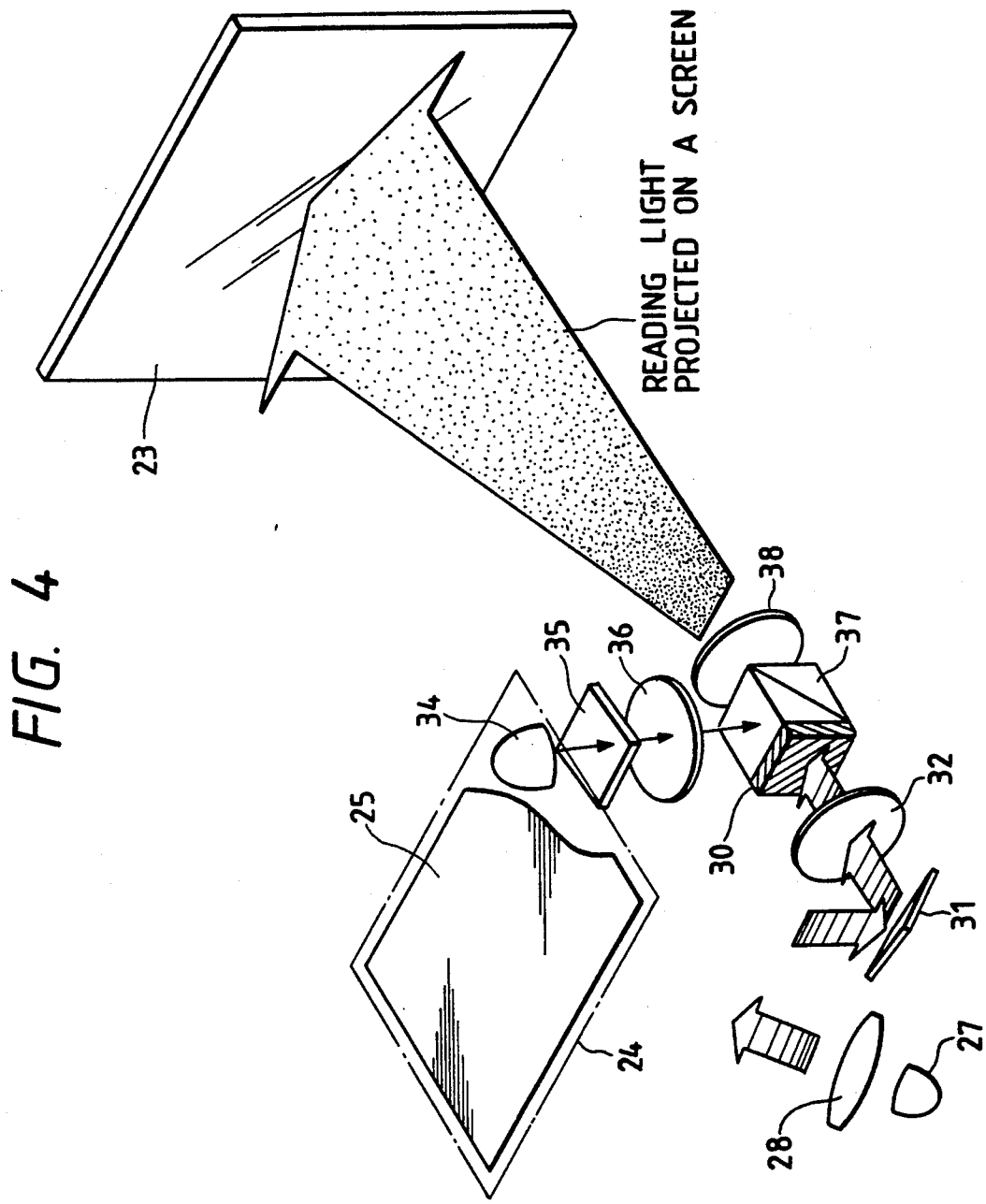
FIG. 4 is a diagonal view showing explanatorily main members of an overhead projector with a spatial light modulator according to a first embodiment of the present invention.

FIG. 4 is a diagonal view explanatorily showing main members of an overhead projector with a spatial light modulator according to a first embodiment of the present invention. Also, FIG. 5 is a side cross-sectional view perspectively showing main members of an overhead projector with a spatial light modulator according to a first embodiment of the present invention.

Figure 5:
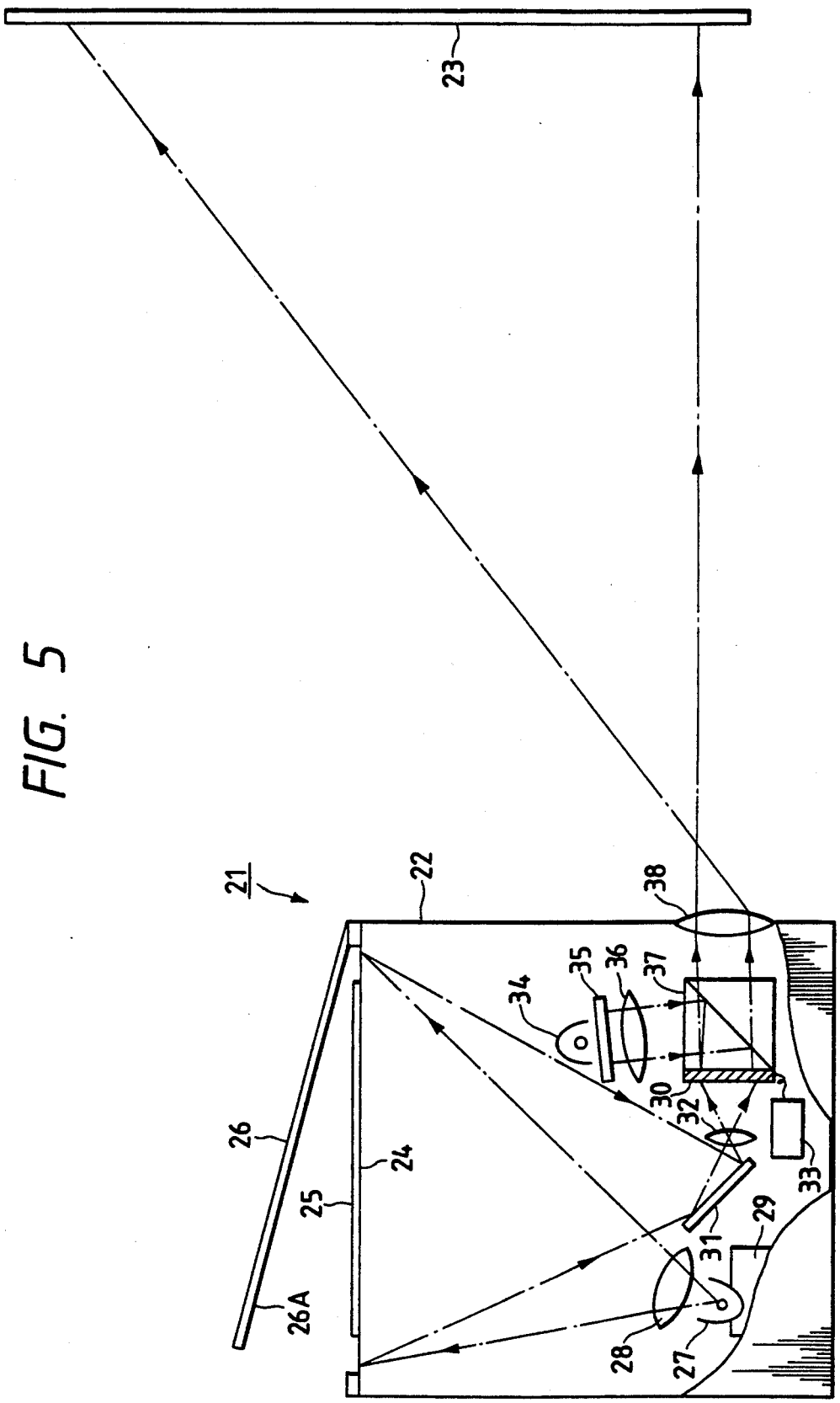
FIG. 5 is a side cross-sectional view perspectively showing main members of an overhead projector with a spatial light modulator according to a first embodiment of the present invention.

As shown in FIGS. 4 and 5, constructional members of an overhead projector 21 is accommodated in a box type of overhead projector body 22. In addition, a screen 23 is arranged above the level of the body 22 to project an image of a subject reproduced in the body 22.

The body 22 accommodates a manuscript stand 24 arranged on the upper surface of the body 22 for putting a manuscript film 25, a manuscript cover 26 arranged on the manuscript stand 24 for holding down the manuscript film 25, a writing light source 27 arranged in one bottom part for generating writing light with which the manuscript film 25 is illuminated, a first optical system 28 for converging the writing light to illuminate the entire manuscript film 25 with the writing light, a light adjusting device 29 for adjusting both the intensity and the color of the writing light according to the density of a manuscript drawn in the manuscript film 25, a spatial light modulator 30 arranged in another bottom part of the body 22 for receiving the writing light reflected by the manuscript film 25 and the manuscript cover 26, a mirror 31 for again reflecting the reflected writing light in a direction of one side of the spatial light modulator 30, a second optical system 32 for converging the writing light reflected by the mirror 31 to illuminate the entire surface of one side of the light modulator 30 with the writing light, and a sensitivity adjusting device 33 for adjusting the writing light sensitivity of the spatial light modulator 30 by varying a voltage applied to the light modulator 30.

A surface 26A of the manuscript cover 26 opposite to the manuscript table 24 is formed by a reflector for reflecting the writing light. Also, the writing light source 27 is, for example, formed by a halogen lamp, a light emitting diode (LED), or the like. In this embodiment, the writing light source 27 is selected by considering the sensitivity of a photoconductive layer of the light modulator 30.

Each of the optical systems 28, 32 consists of a plurality of optical members such as lenses according to the pressure of necessity, and a light converging mechanism is provided to each of the optical systems 28, 32, if necessary (not shown). For example, a lens such as a Frenel lens is arranged just under the manuscript film stand 24 to converge the writing light before and after the illumination of the manuscript film 25.

Figure 6A:
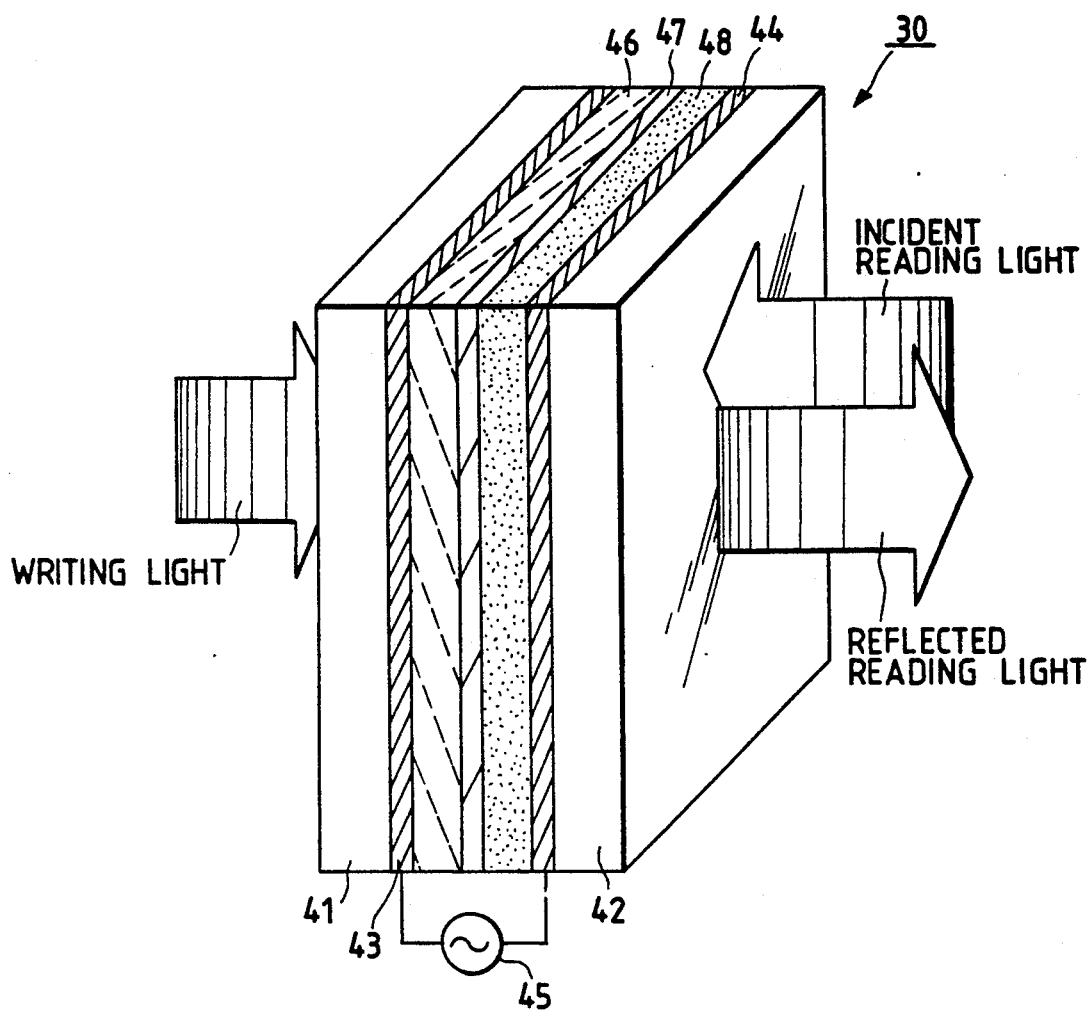
FIG. 6A is an explanatory view of a spatial light modulator of the overhead projector shown in FIGS. 4, 5.

FIG. 6A is an explanatory view of the spatial light modulator 30 of the overhead projector 21 shown in FIGS. 4, 5.

As shown in FIG. 6A, the spatial light modulator 30 comprises:

a pair of transparent substrates 41, 42 for protecting the light modulator 30 from a shock, (1) the writing light passing through the substrate 41 provided to one side of the light modulator 30, and (2) reading light passing through the substrate 42 provided to the other side of the light modulator 30;

a pair of transparent electrodes 43, 44 for receiving alternating voltage from an alternating electric source 45, the electrode 43 being laid on the substrated 41 and the electrode 44 being laid on the substrate 42;

a photoconductive layer 46 laid on the electrode 43 for receiving the writing light of which the intensity is varied according to the manuscript drawn in the manuscript film 25, an electrical resistivity of the photoconductive layer 46 being lowered in proportion to the intensity of the writing light;

a dielectric mirror 47 laid on the photoconductive layer 46 for reflecting the reading light passing through the substrate 42 to prevent the reading light from being transmitted to the photoconductive layer 46; and a light modulating layer 48 sandwiched between the dielectric mirror 47 and the electrode 44 for receiving both the reading light passing through the electrode 44 and the reading light reflected by the dielectric mirror 47, the reading light being modulated by the light modulating layer 48 in proportion to the voltage applied to the layer 48.

The photoconductive layer 46 is, for example, made of amorphous silicon, hydrogenerated amorphous silicon, cadmium selenide (CdSe), cadmium sulfide (CdS), or the like. The dielectric mirror 47 is formed by alternately laying a silicon layer, a silicon dioxide ($SiO_2$) layer, a titanium dioxide ($TiO_2$) layer, and the like by, for example, about seventeen layers. Therefore, the dielectric mirror 47 becomes thinner than the layer 15 of the conventional overhead projector. As a result, the dielectric mirror 47 functions as a mirror selectively reflecting the reading light of which a waveband narrowly ranges from a wavelength 400 to 630 nm, while the layer 15 of the conventional overhead projector functions as a mirror reflecting light with a wide waveband.

Figure 1:
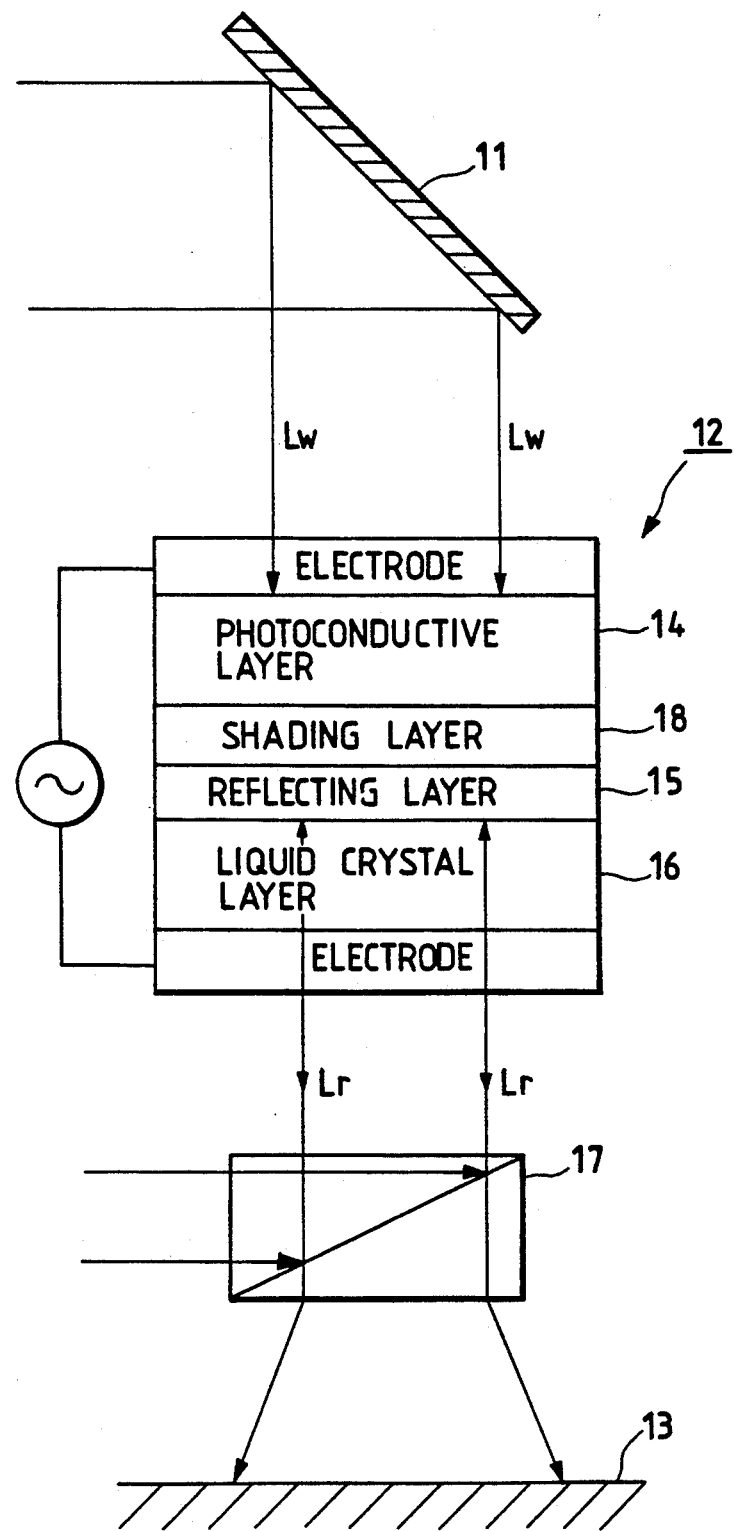
FIG. 1 is a schematic view of a conventional overhead projector with a spatial light modulator.
Figure 2:
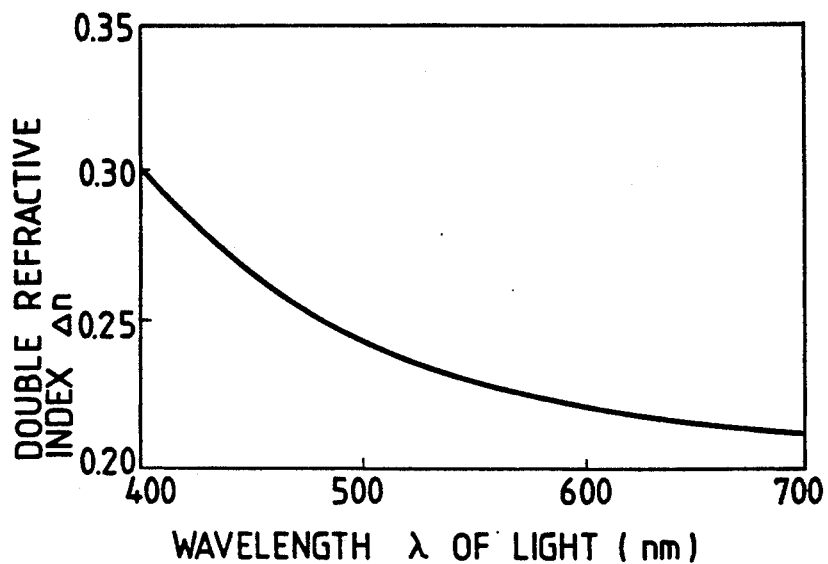
FIG. 2 is a graph of a characteristic curve exemplarily showing relation between a wavelength λ of a light and a double refraction index Δn of a liquid crystal.
Figure 3:
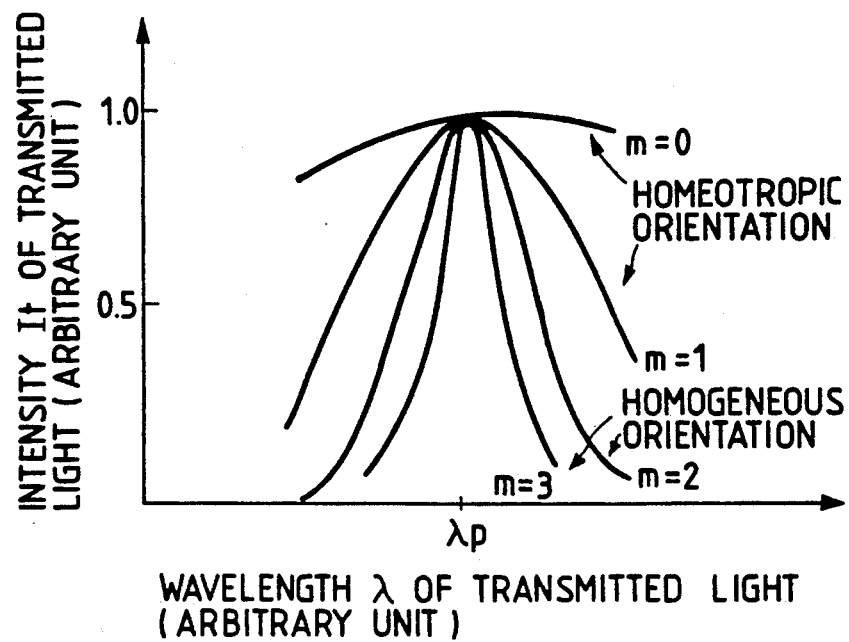
FIG. 3 is a graph of characteristic curves exemplarily showing relation between a wavelength λ of transmitted light and a transmitted light intensity, the degree of the intensity being largely decreased as a value m is increased.

In addition, the light modulating layer 48 is formed by a nematic liquid crystal in which molecules of the liquid crystal are arranged in a homeotropic orientation. Therefore, in cases where the light modulating layer 48 applied a prescribed voltage is irradiated with pieces of reading light, the pieces of reading light are almost evenly modulated even though the reading light has the waveband ranging from a wavelength 400 to 630 nm. In other words, the pieces of reading light are almost evenly rotated optically independent of the wavelengths of the reading light. That is, even though the pieces of reading light optically rotated in the light modulator 30 pass through a polarizer, the intensities of the pieces of reading light are almost evenly reduced independent of the wavelengths of the reading light, while the intensity variation of the reading light considerably depends on the wavelength of the reading light in the conventional overhead projector as shown in FIG. 3. The reason why the intensities of the pieces of reading light reflected by the light modulator 30 are evenly reduced independent of the wavelengths is described with reference to FIG. 3.

As shown in FIG. 3, in cases where the voltage $V_p$ is applied to the light modulating layer 48 with the homeotropic orientation, the value m equals 0 or 1 according to characteristics of the homeotropic orientation. Therefore, the intensity of the reading light with a wavelength $\lambda$ is reduced in the same manner as that of the reading light with a wavelength $\lambda_p$ even though the wavelength $\lambda$ of the reading light differs from the wavelength $\lambda_p$. That is, the intensity of the reading light is almost maintained at a constant value without depending on the wavelength.

In addition, even though the voltage $V_p$ applied to the light modulating layer 48 is varied within a comparatively wide range, the characteristics of the independence of the wavelength are not lost. In other words, a threshold of the voltage $V_p$ applied to the light modulating layer 48 is comparatively high.

In the above configuration of the overhead projector 21, the action that the manuscript drawn in the manuscript film 24 is written in the light modulator 30 is first described.

The manuscript film 25 in which a manuscript to be reproduced onto the screen 23 is drawn is put on the manuscript stand 24 before the manuscript film is held down by the manuscript cover 26.

Thereafter, large pieces of writing light generated by the writing light source 27 are optically controlled by the first optical system 28 before the manuscript film 25 is illuminated with the large pieces of writing light. After illuminating the manuscript film 25 with the large pieces of writing light, the large pieces of writing light is reflected to generate reflected writing light. That is, because each of the large pieces of writing light is strongly or weakly reflected according to density of the manuscript, an intensity distribution is formed in the reflected writing light.

Thereafter, the reflected writing light is reflected once more by the mirror 31 to direct the light towards the light modulator 30 before the reflected writing light is optically controlled by the second optical system 32 to illuminate the entire surface of one side of the light modulator 30 with the reflected writing light. Therefore, the reflected writing light reaches the photoconductive layer 46 through the substrate 41 and the transparent electrode 43. That is, the photoconductive layer 46 receives the reflected writing light in which the intensity distribution is formed.

At this time, the electrical resistivity of the photoconductive layer 46 is reduced in proportion to the intensity of the reflected writing light. That is, in cases where the photoconductive layer 46 is partitioned into a large number of regions for convenience, the electrical resistivity of the photoconductive layer 46 is varied for each region. Therefore, the intensity distribution of the reflected writing light is changed to a resistance distribution in the photoconductive layer 46. That is, the manuscript drawn in the manuscript film 25 is written in the photoconductive layer 46 as image information of the manuscript which denotes the resistance distribution.

In general, a script such as a manuscript, a typescript, a copy, and the like can be written in the photoconductive layer 46 as the image information.

In the above action for writing the image information in the photoconductive layer 46 of the the overhead projector 21, the intensity of the writing light is adjusted by the light adjusting device 29 according to the density and contrast of the manuscript. Also, the color of the writing light is adjusted by the light adjusting device 29 according to the color of the manuscript.

In addition, in cases where a three-dimensional subject is reproduced onto the screen 23 in place of the manuscript film 25, the intensity of the writing light is adjusted by the light adjusting device 29 so that the density of the shadow of the subject reproduced onto the screen 23 is adjusted.

Moreover, in cases where the manuscript film 25 is a small size, the manuscript cover 26 prevents unnecessary light from breaking in the writing light from the outside.

In cases where the manuscript film 25 is made of a transparent film, the writing light penetrating the manuscript film 25 is reflected on the surface 26A of the manuscript cover 26.

Further, the sensitivity of the photoconductive layer 46 is adjusted by the sensitivity adjusting device 33 according to the intensity and color of the reflected writing light.

Accordingly, the image information can be written in the photoconductive layer 46 with faultless precision.

In addition, the sensitivity of the photoconductive layer 46 can be appropriately adjusted by the sensitivity adjusting device 33.

The overhead projector body 22 further accommodates a reading light source 34 arranged above the light modulator 30 for generating source light, a band pass filter 35 for limiting the waveband of the source light to a narrow range to make reading light with which the other side of the light modulator 30 is irradiated, a third optical system 36 for optically controlling the reading light of which the waveband is limited by the band pass filter 35, a beam splitter 37 with a polarizer for splitting the reading light optically controlled by the third optical system 36 into two portions according to a polarization phenomenon, reflecting a portion of splitted reading light towards the other side of the light modulator 30, and polarizing the reading light reflected by the light modulator 30, a projecting optical system 38 arranged on the side surface of the body 22 for spreading the reading light polarized by the beam splitter 37 to project the reading light onto the screen 23.

Figure 6B:
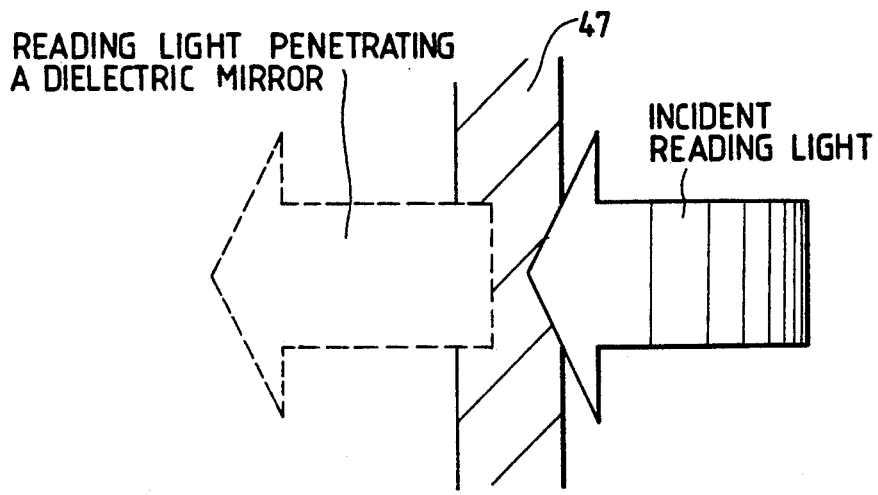
FIG. 6B is an explanatory view showing reading light penetrating through a dielectric mirror of the light modulator shown in FIG. 6A.

In the band pass filter 35, the waveband of the source light generated by the read light source 34 is narrowed at a range from a wavelength 400 nm of a blue light to a wavelength 630 nm of a red light to reduce the reading light penetrating the dielectric mirror 47 of the light modulator 30. In detail, as shown in FIG. 6B, the transmittance of the reading light penetrating the dielectric mirror 47 is quantitatively less than a value $10^{-4}$ in this embodiment. In general, the value $10^{-4}$ indicating the transmittance of the reading light is called "density 4".

In addition, the other side of the light modulator 30 receiving the reading light is arranged almost in parallel with the screen 23, and the light modulator 30 is irradiated with the reading light transmitted from the underside. Therefore, the reading light reflected from the light modulator 30 is transmitted to the projecting optical system 38 at the prescribed upper angle.

The optical system 38 consists of a plurality of optical members such as lenses according to the pressure of necessity, and a light converging mechanism is provided to the optical system 33, if necessary (not shown).

In the above configuration of the overhead projector 21, the action that the image information written in the photoconductive layer 46 is read out is described.

After the image information is written in the photoconductive layer 46, large pieces of reading light made of the source light generated by the reading light source 34 are transmitted to the other side of the light modulator 30 through the band pass filter 35, the third optical system 36 and the beam splitter 37. In this case, the waveband of the reading light is narrowed by the band pass filter 35. That is, the waveband of the reading light is set from a wavelength 400 nm of a blue light to a wavelength 630 nm of a red light. The reading light of which the waveband is narrowed by the band pass filter 35 is optically controlled by the third optical system 36 to irradiate the entire surface of the light modulator 30 with the reading light. Also, the reading light optically controlled by the third optical system 36 is split by the beam splitter 37. In detail, because the beam splitter 37 is formed by a polarizer, perpendicularly polarized reading light to the plane of incidence is reflected by the beam splitter 37 towards the light modulator 30.

When the other side of the light modulator 30 is irradiated with the polarized reading light, the polarized reading light passes through the transparent substrate 42, the transparent electrode 44 and the light modulating layer 48, in that order. Thereafter, the polarized reading light is reflected by the dielectric mirror 47, and the polarized reading light again passes through the light modulating layer 48, the transparent electrode 44 and the transparent substrate 42, in that order. At this time, the polarized reading light is modulated by the light modulating layer 48. In other words, the polarized reading light is optically rotated by a prescribed angle. The degree of the modulation of the polarized reading light is in proportion to the voltage applied to the light modulating layer 48 by the alternating electric source 45. Also, the voltage applied to the light modulating layer 48 is increased when the electrical resistivity of the photoconductive layer 46 is lowered. Therefore, the modulation of the polarized reading light is implemented according to the image information written in the photoconductive layer 46. In other words, the image information of the manuscript is read out by the polarized reading light.

In this case, as described hereinbefore, because the light modulating layer 48 is formed by the nematic liquid crystal with the homeotropic orientation, pieces of polarized reading light passing through a region of the light modulating layer 48 are evenly modulated even though the waveband of the polarized reading light is ranged from a wavelength 400 nm to a wavelength 630 nm. Therefore, when the polarized reading light is again transmitted to the beam splitter 37 after the pieces of polarized reading light are evenly modulated, the intensities of the pieces of polarized reading light passing through a region of the light modulating layer 48 are evenly reduced. As a result, the image information of the manuscript read out by the polarized reading light is denoted by an intensity distribution of the polarized reading light.

Accordingly, because the light modulating layer 48 is formed by the nematic liquid crystal with the homeotropic orientation, pieces of polarized reading light passing through a region of the light modulating layer 48 can be almost evenly modulated independent of the wavelengths of the pieces of polarized reading light. That is, the image with a superior contrast between light and shade can be projected onto the screen 23.

In addition, because the voltage applied to the light modulating layer 48 is allowed to vary within a comparatively wide range on condition that the intensity of the polarized reading light is varied independent of the wavelength of the light, the superior contrast of the polarized reading light can be maintained even though the light modulator 30 is irradiated with external light, of which the waveband is comparatively wide, other than the reading light made of the source light generated by the reading light source 34.

Moreover, because the waveband of the reading light is narrowed by the band pass filter 35 to enhance the selectivity of the wavelength of the reading light reflected by the dielectric mirror 47, the polarized reading light can be perfectly reflected by the dielectric mirror 47 even though the dielectric mirror 47 is considerably thinned. Therefore, because the variation of the electrical resistivity of the photoconductive layer 46 resulting from the reading light penetrating the dielectric mirror 47 is prevented, the deterioration of the resolution and contrast of the image information can be prevented by the dielectric mirror 47.

Next, the action that the image information read out from the light modulating layer 48 is projected onto the screen 23 is described.

After the polarized reading light is transmitted from the light modulator 30, the polarized reading light is projected onto the screen 23 through the beam splitter 37 and the projecting optical system 38 to display the image information onto the screen 23.

At this time, pieces of polarized reading light reading out a bright image which is written in the photoconductive layer 46 by the writing light reflected by the reflector 26A of the manuscript film cover 26 are optically rotated by a prescribed angle by the light demodulating layer 48. Also, the polarization direction of these pieces of polarized reading light agrees with that of the beam splitter 37 in this embodiment.

Accordingly, the intensity of the polarized reading light reading out the bright image will almost never be reduced by the beam splitter 37 with the polarizer.

In addition, because the light modulator 30 is almost in parallel with the screen 23 and the polarized reading light reflected from the light modulator 30 is transmitted to the projecting optical system 38 at an upper angle, the undistorted image of the manuscript can be projected onto the screen 23 which is arranged above the level of the overhead projector 21. Therefore, any projecting head is not required to show the image projected onto the screen 23 to an audience.

Moreover, because no projecting head is provided above the body 22, the image of the manuscript can be easily observed without being obstructed by any projecting head.

The overhead projector 21 with a spatial light modulator was manufactured by the inventors according to the first embodiment before this specification is submitted. In this manufacturing, for example, the transmittance of the reading light penetrating the dielectric mirror 47 was set at less than a value $10^{-4}$. According to the measurement of the contrast projected onto the screen 23, the luminance ratio of light regions to shade regions was more than 100 to 1.

2. Second embodiment:

A second embodiment according to the present invention is described with reference to FIG. 7.

In this case, the reference characters utilized in the previous embodiment are utilized for the same structural members utilized in the other embodiments as those of the previous embodiment.

Figure 7:
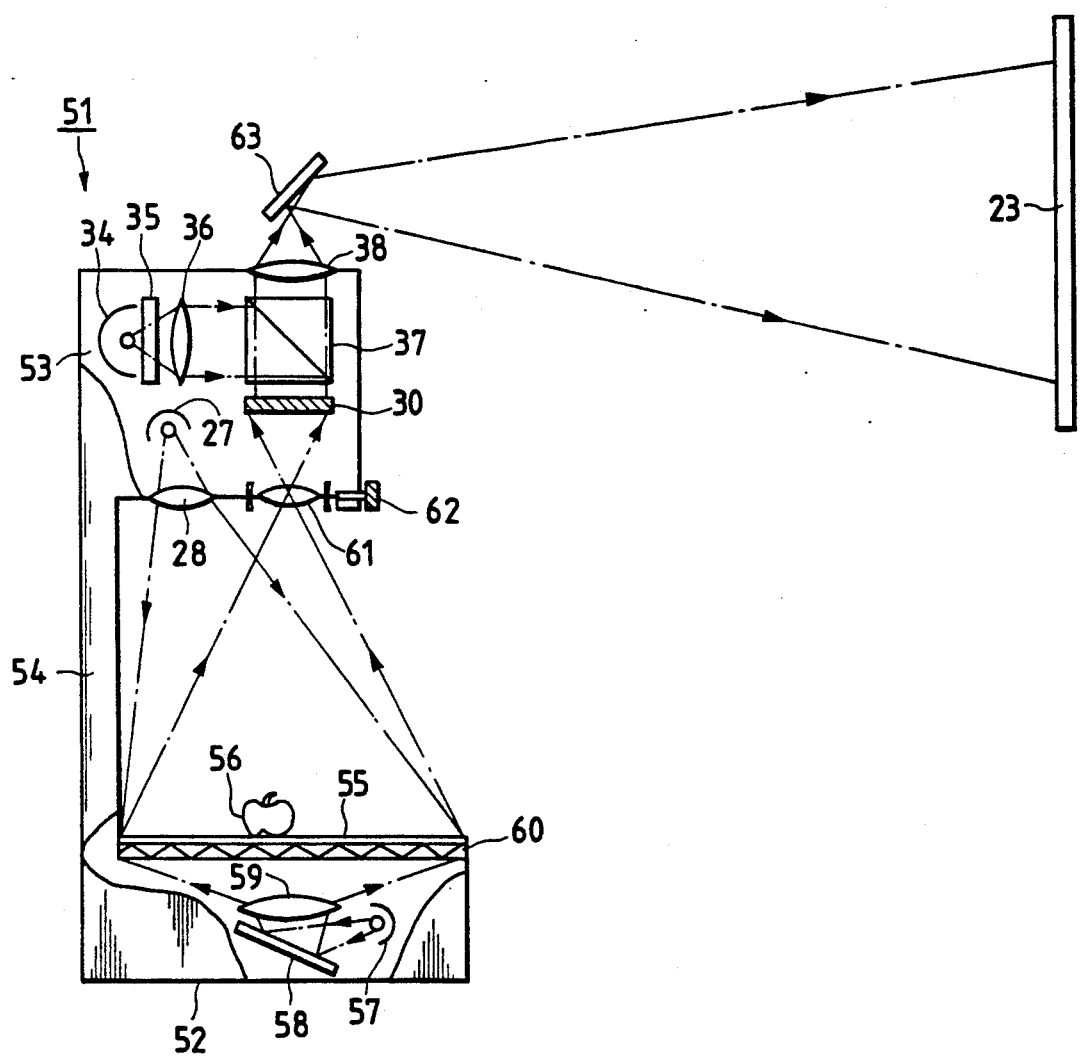
FIG. 7 is a side cross-sectional view perspectively showing main members of an overhead projector with a spatial light modulator according to a second embodiment of the present invention.

FIG. 7 is a side cross-sectional view perspectively showing main members of an overhead projector with a spatial light modulator according to a second embodiment of the present invention.

As shown in FIG. 7, structural members of an overhead projector 51 are accommodated in a box type of base stand 52 and a box type of projecting head 53 arranged above the base stand 52. Also, a supporting arm 54 is arranged between the base stand 52 and the projecting head 53 to support the projecting head 53 above the base stand 52.

The base stand 52 accommodates a subject stand 55 arranged on the upper surface of the base stand 52 for putting a three-dimensional subject 56 such as an apple, a second writing light source 57 for generating second writing light to illuminate the three-dimensional subject 56, a second mirror 58 for reflecting the second writing light towards the subject stand 55, a fourth optical system 59 for optically controlling the second writing light to illuminate the entire subject stand 55 from under the subject stand 55, and a Fresnel lens 60 arranged just under the subject stand 55 for transmitting the second writing light to the projecting head 53 without any distortion.

The projecting head 53 accommodates the writing light source 27, the first optical system 28 arranged on the bottom surface of the projecting head 53, an adjustable optical system 61 arranged on the bottom surface of the projecting head 53 for compensating the height of the subject 56 illuminated with either the writing light or the second writing light and is reflected by the Fresnel lens 60, a manual focus mechanism 62 for adjusting the focus of the adjustable optical system 61 by hand, the light modulator 30 arranged just above the adjustable optical system 61, the reading light source 34 arranged in the upper part of the projecting head 53, the band pass filter 35, the third optical system 36, the beam splitter 37 arranged just above the light modulator 30, the projecting optical system 38 arranged just above the beam splitter 37, and a projecting mirror 63 for reflecting the reading light transmitted from the light modulator 30 through both the beam splitter 37 and the projecting optical system 38 to project the reading light onto the screen 23.

In addition, the screen 23 is arranged at the level of the projecting head 53.

In the above configuration of the overhead projector 51, the action is described.

In cases where the three-dimensional subject 56 is put on the subject stand 55, the three-dimensional subject 56 is illuminated with the writing light generated by the writing light source 27 from the projecting head 53. Thereafter, the writing light is reflected by the Fresnel lens 60 without any distortion before the reflected writing light is written in the light modulator 30 through the adjustable optical system 61. In this case, the focus of the adjustable optical system 61 is adjusted by the manual focus mechanism 62 to reproduce the subject 56 with a suitable shadow onto the screen 23. That is, the influence of the subject height on the focal distance of the writing light is compensated by the adjustable optical system 61. Thereafter, the reading light made of the source light generated by the reading light source 34 is transmitted to the other side of the light modulator 30 at right angles through the band pass filter 35, the third optical system 36 and the beam splitter 38. Thereafter, the reading light is transmitted to the projecting mirror 63 through the beam splitter 37 and the projecting optical system 38 at right angles to the other side of the light modulator 30. Thereafter, the reading light is spread by the projecting mirror 63 to project an enlarged image of the subject 56 onto the screen 23.

Accordingly, even though the three-dimensional subject 56 is tried to reproduce onto the screen 23, the image of the subject 56 can be suitably projected onto the screen 23 according to the form and shape of the subject 56 because the focus of the adjustable optical system 61 can be adjusted by the manual focus mechanism 62 to reproduce the subject 56 with a suitable shadow.

In cases where an opaque film in which a manuscript is drawn is put on the subject stand 55, the overhead projector 51 is operated in the same manner as the projection of the three-dimensional subject 56. For example, in cases where a thick book is put on the subject stand 55 in place of the three-dimensional subject 56, the focus of the adjustable optical system 61 is adjusted to compensate the thickness of the thick book.

Accordingly, even though the manuscript drawn in the thick book is tried to reproduce onto the screen 23, the image of the manuscript can be suitably projected onto the screen 23.

In cases where a transparent film in which a manuscript is drawn is put on the subject stand 55, the manuscript drawn in the transparent film is illuminated with the second writing source generated by the second writing light source 57 from under the subject stand 55. That is, the second writing light is transmitted through the second mirror 58 and the Fresnel lens 60. In this case, though the second writing light is strongly converged by the Fresnel lens 60 to transmit the light to the light modulator 30, no distortion is generated in the second writing light by characteristics of the Fresnel lens 60.

Thereafter, the manuscript drawn in the transparent film is reproduced onto the screen 23 in the same manner as the projection of the three-dimensional subject 56.

Accordingly, even though the transparent film is put on the subject stand 55, the manuscript can be illuminated with the second writing light.

In addition, in cases where the manuscript drawn on a manuscript film is illuminated with either the writing light or the second writing light, an operator can indicate the manuscript to an audience by utilizing a conducting stick because an opening space is formed between the base stand 52 and the projecting head 53.

3. Third embodiment:

A third embodiment according to the present invention is described with reference to FIG. 8.

Figure 8:
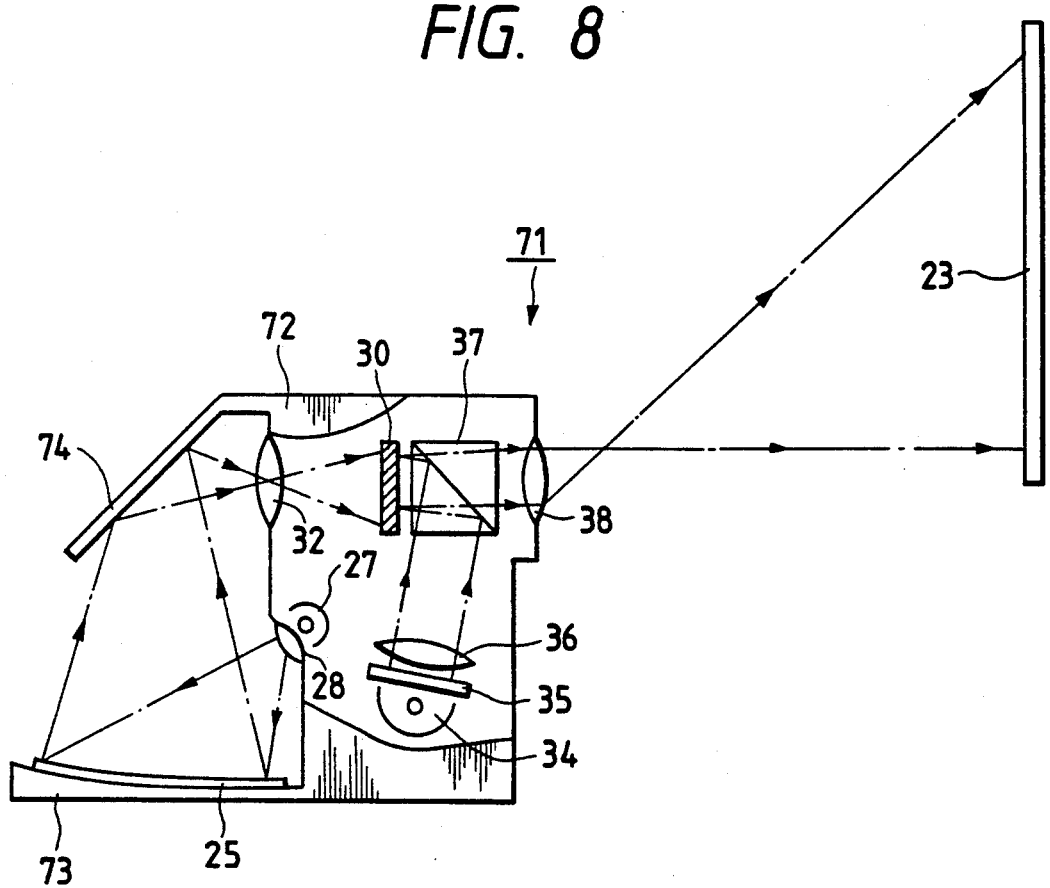
FIG. 8 is a side cross-sectional view perspectively showing main members of an overhead projector with a spatial light modulator according to a third embodiment of the present invention.

FIG. 8 is a side cross-sectional view perspectively showing main members of an overhead projector with a spatial light modulator according to a third embodiment of the present invention.

As shown in FIG. 8, structural members of an overhead projector 71 are accommodated in a flat box type of overhead projector body 72. In addition, the screen 23 is arranged above the level of the body 72.

The body 72 accommodates the writing light source 27 arranged in the middle of the body 72, the first optical system 28, a concave type of manuscript film stand 73 arranged on the bottom part of the body 72 for converging the writing light, a tail type of mirror 74 arranged just above the manuscript film stand 73 for reflecting the writing light to the light modulator 30, the second optical mirror 32, the light modulator 30 arranged in the upper part of the body 72, the reading light source 34 arranged in the bottom part of the body 72, the band pass filter 35, the third optical system 36, the beam splitter 37 adjacent to the light modulator 30, and the projecting optical system 38 arranged on the upper side of the body 72.

In addition, the screen 23 is arranged above the level of the overhead projector 71.

In the above configuration, the action of the overhead projector 71 is described.

The writing light with which the manuscript drawn in the manuscript film 25 put on the manuscript film stand 73 is illuminated and reflected by the manuscript film towards the mirror 74 while being converged by the manuscript film stand 73. Thereafter, the writing light is written in the light modulator 30 through the second optical system 32, and the image of the manuscript is projected onto the screen 23 in the same manner as in the first embodiment.

Accordingly, because the writing light is converged by the manuscript film stand 73 and the writing light is reflected to have the writing light transmitted in the flat body 72, the height of the box 72 can be lowered.

In addition, although the overhead projector 71 is provided with no projecting overhead, the image of the manuscript can be projected onto the screen 23 arranged above the box 72.

Further, an operator can indicate the manuscript to an audience by utilizing a conducting stick because an opening space is formed between the manuscript film stand 73 and the the mirror 74.

4. Fourth embodiment:

A fourth embodiment according to the present invention is described with reference to FIG. 9.

Figure 9:
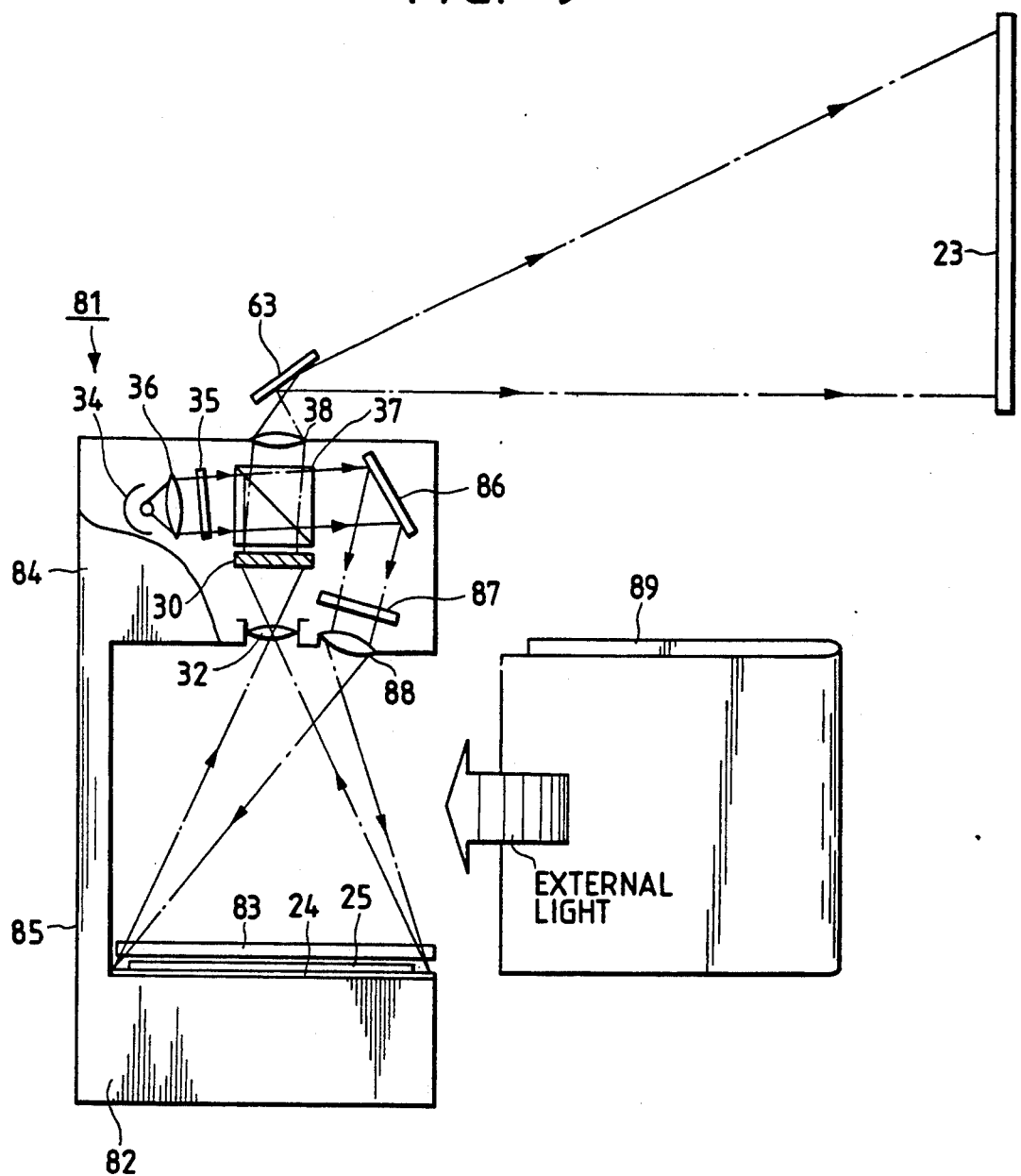
FIG. 9 is a side cross-sectional view perspectively showing main members of an overhead projector with a spatial light modulator according to a fourth embodiment of the present invention.

FIG. 9 is a side cross-sectional view perspectively showing main members of an overhead projector with a spatial light modulator according to a fourth embodiment of the present invention.

As shown in FIG. 9, an overhead projector 81 comprises a base stand 82 on which the manuscript film stand 24 and a Fresnel lens 83 arranged on the stand 24 are provided, a box type of projecting head 84 arranged above the base stand 82, and a supporting arm 85 arranged between the base stand 82 and the projecting head 84 for supporting the projecting head 84 above the base stand 82.

The projecting head 84 accommodates the reading light source 34 arranged in the left upper part, the third optical system 36, the band pass filter 35, the beam splitter 37, a writing light mirror 86 arranged in the right upper part for reflecting parallel polarized light to the place of incidence (or P polarized light) which passes through the beam splitter 37, a light filter 87 with a polarizer for adjusting the intensity of the P polarized light, an optical system 88 arranged on the bottom surface for focusing the P polarized light to illuminate the manuscript drawn in the manuscript film 25 with the P polarized light, the second optical system 32 arranged on the bottom surface, the light modulator 30 adjacent to the beam splitter 37, the projecting optical system 38 arranged on the upper surface, and the projecting mirror 63 arranged above the projecting optical system 38.

In addition, the screen 23 is arranged above the level of the overhead projector 81.

In the above configuration, the action of the overhead projector 81 is described.

The main feature of the fourth embodiment is that the P polarized light splitted by the beam splitter 37 is utilized as the writing light, while the P polarized light is discarded without utilizing for any purpose in the first to third embodiments.

The source light generated by the reading light source 34 is splitted into two types of light by the beam splitter 38. That is, one type of light is the P polarized light with which the manuscript drawn in the manuscript film 25 is illuminated after the P polarized light is transmitted to the optical system 88 through the writing light mirror 86 and the light filter 87. Another type of light is perpendicularly polarized light to the plane of incidence (or S polarized light) with which the other side of the light modulator 30 is irradiated at a slanting angle.

In this case, because the intensity of the source light is generally set at a high value to project the image onto the screen 23 as compared with that of the writing light generated by the writing light source 27, the intensity of the P polarized light is adjusted with the light filter 87 consisting of a polarizer by setting a polarization direction of the light filter 87a at a suitable rotation angle to a polarization direction of the P polarized light. Therefore, the intensity of the P polarized light can be adjusted at a prescribed degree appropriate for the writing light.

Thereafter, the P polarized light is reflected by the manuscript film 25 put on the manuscript film stand 24. In this case, the P polarized light is converged by the Fresnel lens 83 without distorting the image of the manuscript before and after the illumination of the manuscript film 25 with the P polarized light. Thereafter, the image of the manuscript is written in the light modulator 30 through the second optical system 32.

Thereafter, the image of the manuscript is read out from the light modulator 30 by the S polarized light transmitted to the light modulator 30. Thereafter, the image of the manuscript is projected onto the screen 23 through the projecting optical system 38 and the projecting mirror 63. In this case, the image reflecting on the projecting mirror 63 is projected in a upward direction without any image distortion because the light modulator 30 is irradiated with the S polarized light at a slanting angle.

In cases where the image projected onto the screen 23 is disturbed by external light transmitted to an open space between the base stand 82 and the projecting head 84, it is preferable that the open space be covered by a cover 89 to block off the external light.

Accordingly, because the P polarized light is utilized, the utilization of the P polarized light can be effectively implemented without any writing light source. Moreover, the consumption of the electric power can be reduced. Also, because no writing light source is provided, no member is accommodated in the base stand 82. As a result, the configuration of the overhead projector 81 can be simplified, and the overhead projector 81 can be manufactured at a small size.

In addition, an audience can see the image reproduced onto the screen 23 without being obstructed by the projecting head 84 because the image of the manuscript is projected onto the screen 23 arranged above the projecting head 84.

Moreover, because the P polarized light is converged by the Fresnel lens 83, the image of the manuscript can be written in the light modulator 30 without any distortion.

Further, because the open space between the base stand 82 and the projecting head 84 is shielded by the open cover 89, the image projected onto the screen 23 cannot be disturbed by the external light. Therefore, an audience can clearly see the image onto the screen 23.

5. Fifth embodiment:

A fifth embodiment according to the present invention is described with reference to FIG. 10.

Figure 10:
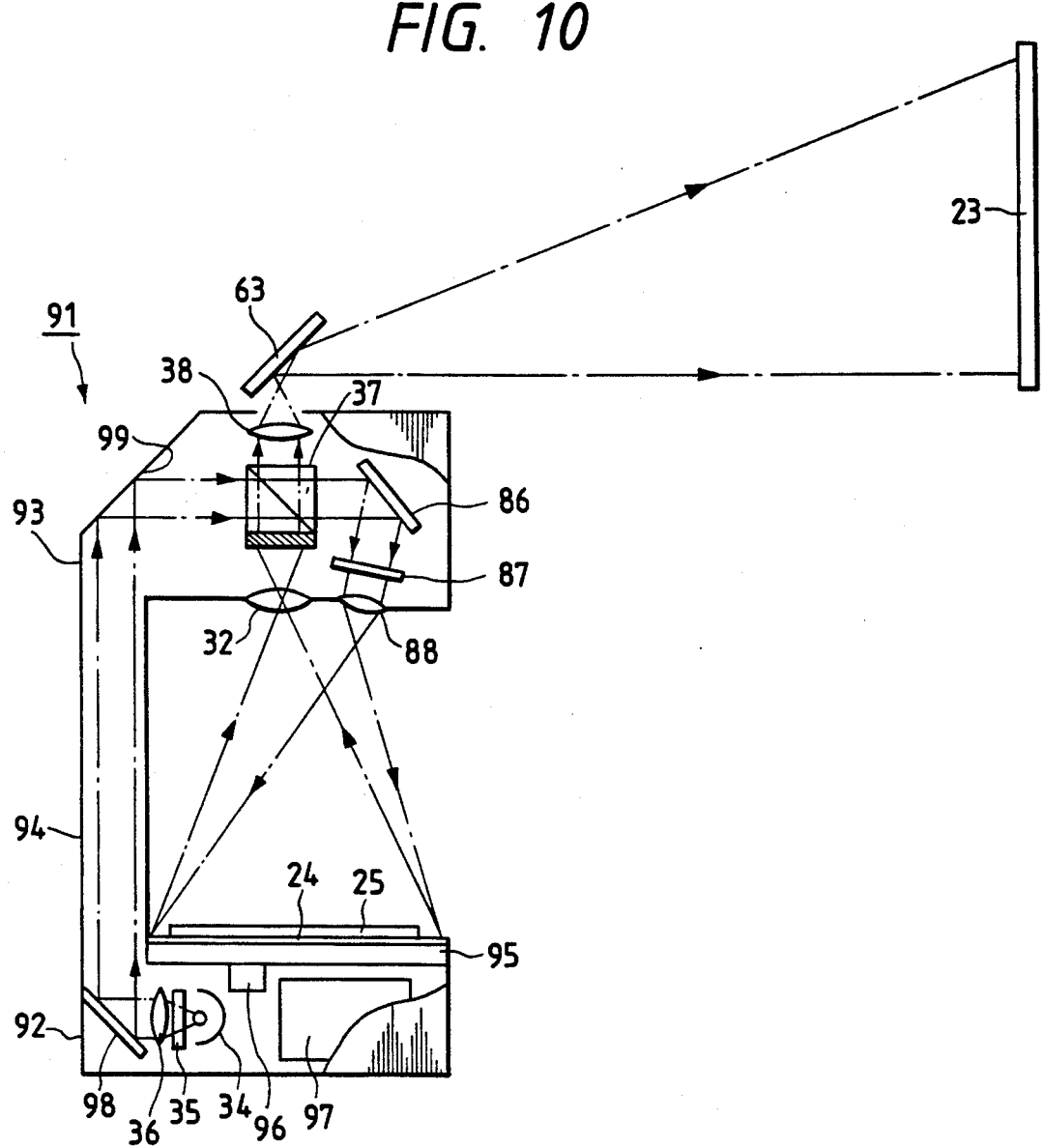
FIG. 10 is a side cross-sectional view perspectively showing main members of an overhead projector with a spatial light modulator according to a fifth embodiment of the present invention.

FIG. 10 is a side cross-sectional view perspectively showing main members of an overhead projector with a spatial light modulator according to a fifth embodiment of the present invention.

As shown in FIG. 10, an overhead projector 91 comprises a box type of base stand 92 on which the manuscript film stand 24 is provided, a box type of projecting head 93 arranged above the base stand 92, and a supporting arm 94 arranged between the base stand 92 and the projecting head 93 for supporting the projecting head 93 above the base stand 92.

The base stand 92 accommodates a flat light source 95 arranged in the upper part for illuminating the manuscript film stand 24 with flat light, a light modulating device 96 for modulating the flat light, a driving circuit 97 for generating electric power to drive the flat light source 95 and the light modulating device 96, the reading light source 34, the band pass filter 35, the third optical system 36, and a transmitting mirror 98 for reflecting the reading light towards the projecting head 93 through the supporting arm 94.

The projecting head 93 accommodates a wall mirror 99 for reflecting the reading light transmitted from the transmitting mirror 98. Moreover, projecting head 93 accommodates the beam splitter 37, the writing light mirror 86, the light filter 87, the optical system 88, the second optical system 32, the light modulator 30, the objecting optical system 38, and the objecting mirror 63 in the same manner as in the fourth embodiment.

The flat light source 95 is, for example, a fluorescent light tube or an electroluminescent lamp (EL) utilized for a liquid crystal display device and the like.

In addition, the screen 23 is arranged above the level of the overhead projector 91.

In the above configuration, the action of the overhead projector 91 is described.

One of main features of the fifth embodiment is that the P polarized light is utilized as the writing light in the same manner as in the fourth embodiment. Another main feature is that members relating to the source light are accommodated in the base stand 92.

In cases where the three-dimensional subject 56 is put on the manuscript film stand 24, the manuscript film stand 24 is illuminated with the flat light generated by the flat light source 95 while modulating the flat light by utilizing the light modulating device 96. Also, the source light which is generated and is optically processed in the base stand 92 is transmitted to the projecting head 93 before the subject 56 is illuminated with the P polarized light. Thereafter, the image of the three-dimensional subject 56 is projected onto the screen 23.

In this case, the brightness of a background of the image projected onto the screen 23 is adjusted by the flat light of which the intensity is adjusted by the light modulating device 96.

Accordingly, the image with an elaborate contrast between light and shade can be projected onto the screen 23.

In cases where the transparent film 25 in which the manuscript is drawn is put on the manuscript film stand 24, the transparent film 25 is illuminated with only the flat light, and the image of the manuscript is reproduced onto the screen 23. In this case, the manuscript is not illuminated with the P polarized light.

In cases where the opaque film 25 in which the manuscript is drawn is put on the manuscript film stand 24, the opaque film 25 is illuminated with only the P polarized light. In this case, the manuscript film 24 is not illuminated with the flat light.

Accordingly, the projecting head 93 can be manufactured for compactness and light weight because the members relating to the source light is generally heavy and is accommodated in the base stand 92.

In addition, an audience can be see the image reproduced onto the screen 23 without being disturbed by the projecting head 93 because the projecting head 93 is manufactured in a small size.

In the first to fifth embodiments, the image information such as the manuscript and the subject is written in the light modulator 30 according to only the intensity distribution of the large pieces of writing light. In other words, the image information is written in the light modulator 30, independent of a wavelength distribution formed by the large pieces of writing light. In addition, the image information written in the light modulator 30 is read out by the reading light according to only the intensity distribution stored in the light modulator 30. In other words, even though the waveband of the reading light is ranged from a red color to a blue color, the intensities of pieces of reading light passing through a region of the light modulating layer 48 are evenly varied, independent of the wavelength of the reading light. Therefore, the image information projected onto the screen 23 is displayed by the contrast between light and shade. In other words, a colorless image is reproduced onto the screen 23.

6. Sixth embodiment:

A sixth embodiment according to the present invention is described with reference to FIG. 11. In the sixth embodiment, a highly colorful image is reproduced onto the screen 23.

Figure 11:
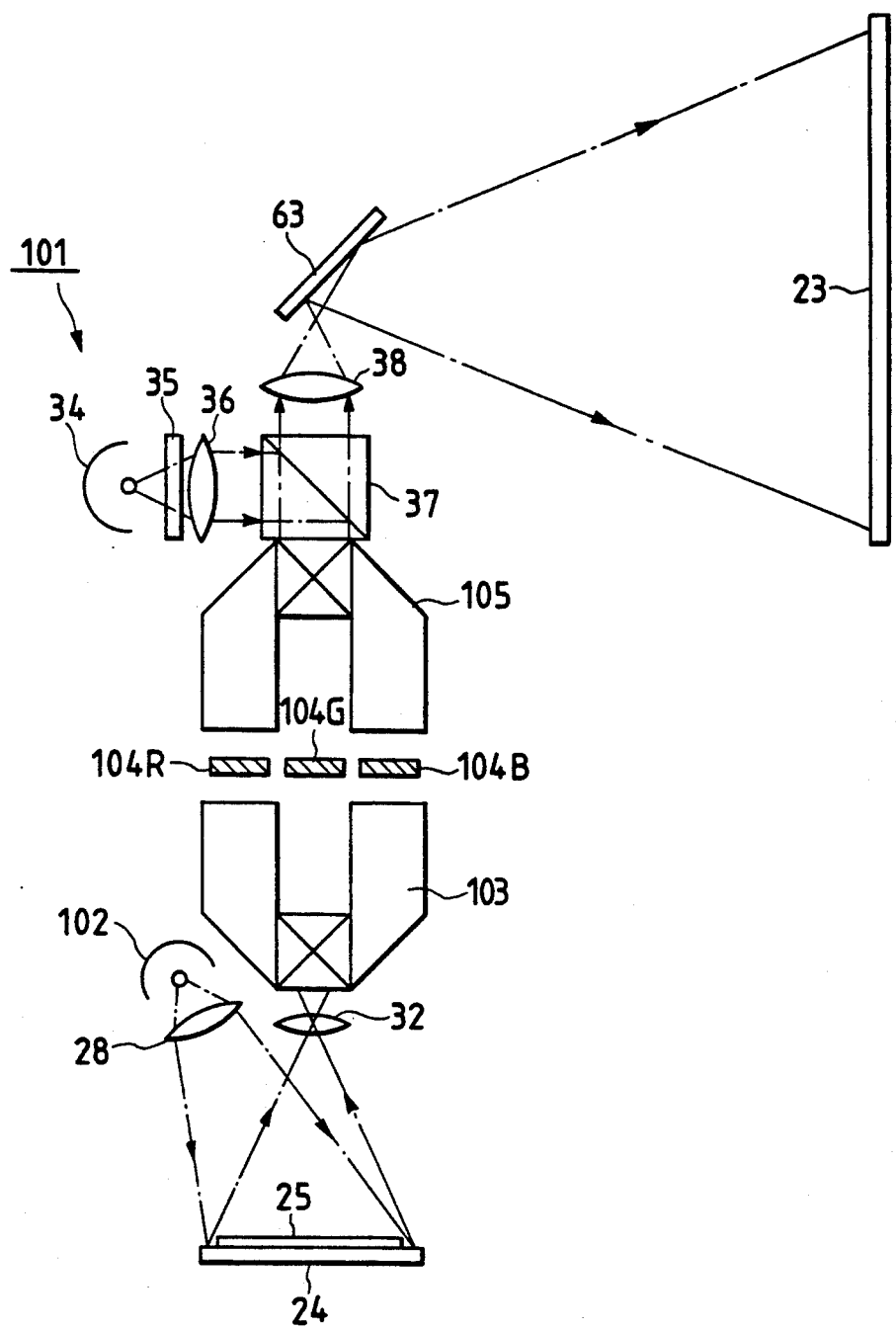
FIG. 11 is a side cross-sectional view perspectively showing main members of an overhead projector with a spatial light modulator according to a sixth embodiment of the present invention.

FIG. 11 is a side cross-sectional view perspectively showing main members of an overhead projector with a spatial light modulator according to a sixth embodiment of the present invention.

As shown in FIG. 11, an overhead projector 101 comprises a writing light source 102 for generating visible light source of which a waveband ranges over three primary colors such as the red light, the green light and the blue light, the first optical system 28, the manuscript film stand 24, the second optical system 32, a light separation device 103 for separating the writing light to three primary color components of the writing light such as a red light component, a green light component and a blue light component, three types of spatial light modulators 104R, 104G, 104B for receiving respective monochromatic images transmitted by the three primary color components of the writing light reflected by a colorful manuscript in the same manner as the light modulator 30, the reading light source 34, the band pass filter 35, the third optical system 36, the beam splitter 37, a light separation/composition device 105 for separating the reading light transmitted from the beam splitter 37 to three primary color components of the reading light and composing the three primary color components of the reading light reflected from the light modulators 104R, 104G and 104B, the objecting optical system 38, and the objecting mirror 63.

Structural members of each of the light modulators 104R, 104G, and 104B are basically the same as those of the light modulator 30, except for the photoconductive layer 46, the dielectric mirror 47, and the light modulating layer 48. That is, the light modulator 104R comprises a photoconductive layer 106R of which the electrical resistivity is selectively reduced by the red light component of the writing light at high sensitivity, a dielectric mirror 107R by which the red light component of the reading light is selectively reflected, and a light modulating layer 108R in which the red light component of the reading light is selectively modulated at high sensitivity. In the same manner, the light modulator 104G comprises a photoconductive layer 106G, a dielectric mirror 107G, and a light modulating layer 108G which each are selectively sensitive to the green light component. Also, the light modulator 104B comprises a photoconductive layer 106B, a dielectric mirror 107B, and a light modulating layer 108B which each are selectively sensitive to the blue light component.

In addition, the dielectric mirrors 107R, 107G and 107B is respectively thinner than the dielectric mirror 47 because the dielectric mirrors 107R, 107G and 107B reflects the respective primary color components of which the wavebands are respectively narrowed.

The photoconductive layers 106R, 106G and 106B are respectively made of amorphous silicon, cadmium selenide (CdSe), cadmium sulfide (CdS), or the like.

The light modulating layers 108R, 108G and 108B are respectively formed by a nematic liquid crystal in which molecules of the liquid crystal are arranged in a homeotropic orientation, in the same manner as that in the first embodiment.

The transmittance of the primary color components of the reading light penetrating the respective dielectric mirrors 107R, 107G and 107B is less than a value $10^{-4}$ in the same manner as that in the first embodiment.

In the above configuration, the action of the overhead projector 101 is described.

The manuscript film 25 is illuminated with the writing light generated by the writing light source 102 before the writing light is transmitted to the light separation device 103 through the second optical system 32.

Thereafter, the writing light is separated to three primary color components such as the red light, the green light and the blur light.

The waveband of the red light component ranges from a wavelength 590 nm to 640 nm. The waveband of the green light component ranges from a wavelength 490 nm to 600 nm. Also, the waveband of the blur light component ranges from a wavelength 400 nm to 500 nm.

Thereafter, the light modulator 104R is irradiated with the red light component of the writing light separated by the light separation device 103. Therefore, a monochromatic image of a red part of a colorful manuscript is written in the photoconductive layer 106R according to the intensity distribution of the red light component of the writing light. In the same manner, the light modulator 104G is irradiated with the green light component of the writing light. Therefore, a monochromatic image of a green part of the colorful manuscript is written in the photoconductive layer 106G according to the intensity distribution of the green light component of the writing light. Also, the light modulator 104B is irradiated with the blur light component of the writing light. Therefore, a monochromatic image of a blue part of the colorful manuscript is written in the photoconductive layer 106B according to the intensity distribution of the blur light component of the writing light.

Thereafter, the reading light made of the source light generated by the reading light source 34 is transmitted to the light separation/composition device 105 through the band pass filter 35, the third optical system 36 and the beam splitter 37. In the light separation/composition device 105, the reading light is separated to three primary color components of the reading light in the same manner as those of the writing light in the light separation device 103. Thereafter, the light modulator 104R is irradiated with the red light component of the reading light separated by the light separation/composition device 105. Therefore, the monochromatic image of the red part of the colorful manuscript is read out by the red light component of the reading light. In the same manner, the light modulator 104G is irradiated with the green light component of the reading light separated by the light separation/composition device 105. Therefore, the monochromatic image of the green part of the colorful manuscript is read out by the green light component of the reading light. Also, the light modulator 104B is irradiated with the blur light component of the reading light separated by the light separation/composition device 105. Therefore, the monochromatic image of the blue part of the colorful manuscript is read out by the blue light component of the reading light.

Thereafter, the red, green and blur light components of the reading light are composed one another in the light separation/composition device 105 so that a colored image of the colorful manuscript is reproduced by the composition of the three monochromatic images. Thereafter, the colored image is projected onto the screen 23 through the objecting optical system 38 and the objecting mirror 63.

Accordingly, because the writing light ranging from the red light to the blur light with which the manuscript is illuminated is separated to three primary color components, the three monochromatic images of the colorful manuscript can be written in the respective light modulators 104R, 104G and 104B. Also, because the three monochromatic images of the colorful manuscript are read out by the respective three primary color components of the reading light separated by the light separation/composition device 105, a colorful image of the manuscript can be projected onto the screen 23 after the three monochromatic images are composed one another by the light separation/composition device 105.

In addition, because the light modulating layers 108R, 108G and 108B are respectively formed by the nematic liquid crystal with the homeotropic orientation, pieces of reading light passing through a region of the light modulating layer are almost evenly modulated in the light modulating layers 108R, 108G and 108B independent of the wavelength of the light.

Accordingly, the wavebands of the three primary color components of the reading light can be respectively widened. In addition, a bright colored image of the colorful manuscript can be projected because the intensities of the three primary color components are respectively strengthened by widening the wavebands of the three primary color components.

Moreover, because each transmittance of three primary color components of the reading light penetrating the respective dielectric mirrors 107R, 107G and 107B is less than the value $10^{-4}$, the colored image can be projected onto the screen 23 at high contrast between bright and shade.

In addition, because no shading layer is required to shade the primary color components and the dielectric mirrors 107R, 107G and 107B are respectively thin, the colored image can be projected onto the screen 23 at high resolution.

In the sixth embodiment, although the light modulators 104R, 104G, and 104B are separated from one another, it is preferred that a light modulator be divided into three regions which function to the respective three primary color components.

In addition, it is preferred that the P polarized light obtained in the beam splitter 37 be utilized for the writing light in the same manner as in the fourth embodiment shown in FIG. 9. Also, it is preferred that a transparent film or a three-dimensional subject be illuminated with background light by utilizing the flat source 95, the light modulating device 96 and the driving circuit 97 in the same manner as in the fifth embodiment shown in FIG. 10.

Moreover, it is preferred that the colored image be projected onto a screen arranged above the level of the overhead projector 101.

7. Seventh embodiment:

A seventh embodiment according to the present invention is described with reference to FIG. 12. In the seventh embodiment, a highly colorful image is projected onto the screen 23 in the same manner as in the sixth embodiment.

Figure 12A:
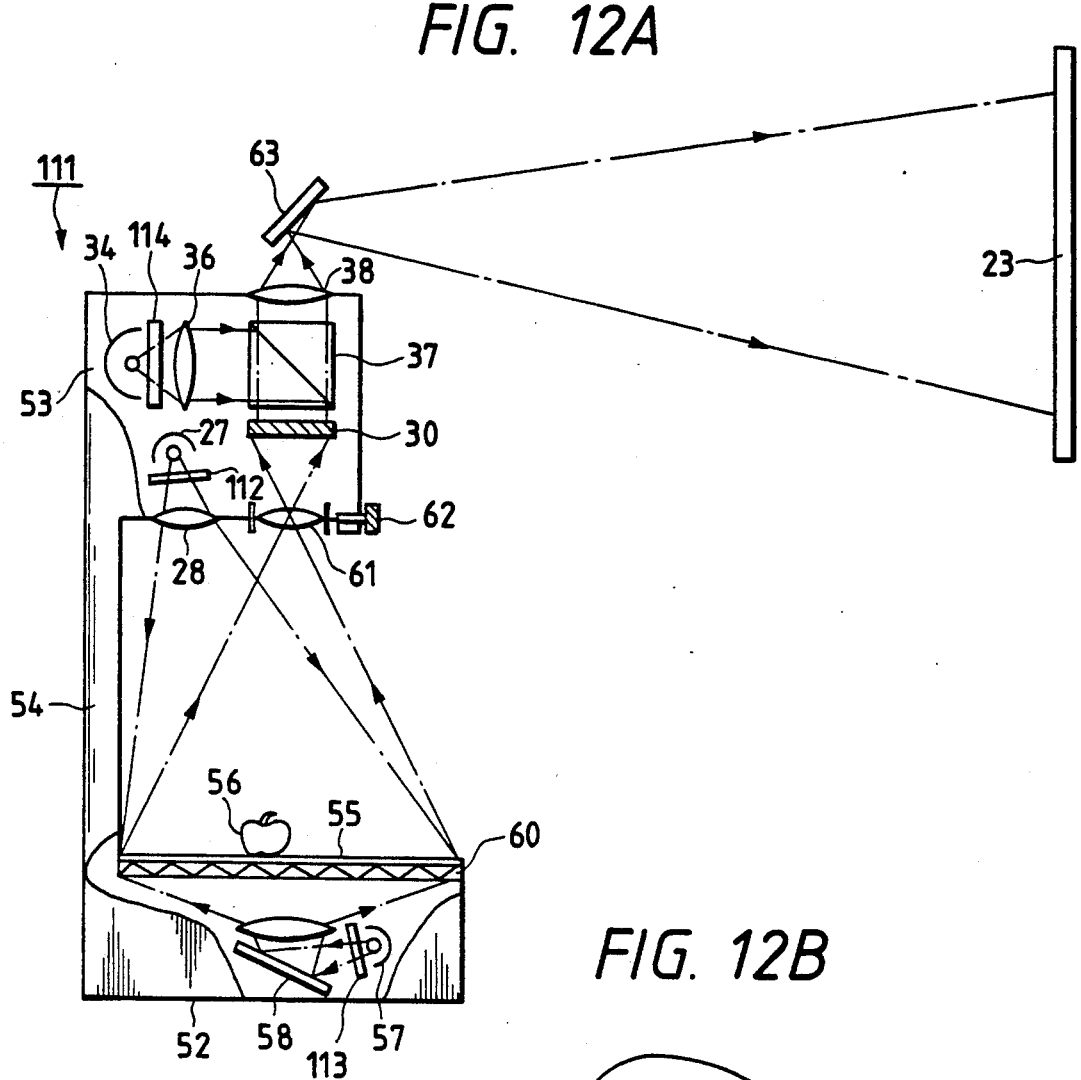
FIG. 12A is a side cross-sectional view perspectively showing main members of an overhead projector with a spatial light modulator according to a seventh embodiment of the present invention.

FIG. 12A is a side cross-sectional view perspectively showing main members of an overhead projector with a spatial light modulator according to a seventh embodiment of the present invention.

As shown in FIG. 12A, structural members of an overhead projector 111 are the same as those of the overhead projector 51 shown in FIG. 7, except for the addition of a first waveband selecting filter 112 arranged between the writing light source 27 and the first optical system 28, a second waveband selecting filter 113 arranged between the second writing light source 57 and the fourth optical system 58, and a third waveband selecting filter 114 arranged in the projecting head 53 in place of the band pass filter 35. A waveband is selected from among the wavebands of three primary color lights with each of the waveband selecting filters 112, 113 and 114.

Figure 12B:
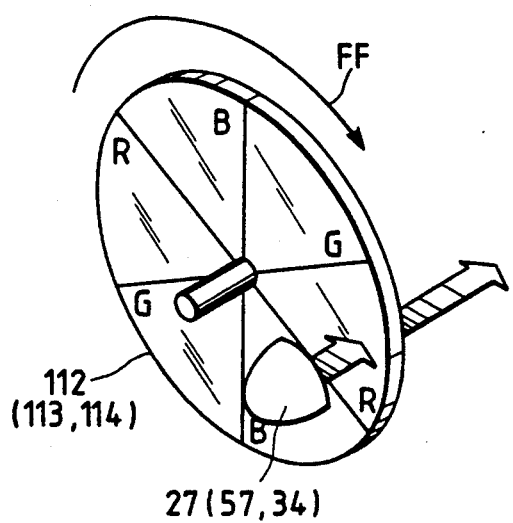
FIG. 12B is a diagonal view explanatorily showing the action of a waveband selecting filter of the overhead projector shown in FIG. 12A.

Each of the waveband selecting filters 112, 113 and 114 is in a rotatory disk form, as shown in FIG. 12B. Each filter is divided into six sectorial regions, each of the three primary color lights passes through a predetermined sectorial region. That is, when the filter is rotated by half of a rotation, the red light, the green light and the blue light sequentially pass through the filter one after another in that order.

Each range of the wavebands is the same as in the sixth embodiment. That is, the waveband of the red light ranges from a wavelength 590 nm to 640 nm. The waveband of the green light ranges from a wavelength 490 nm to 600 nm. Also, the waveband of the blue light ranges from a wavelength 400 nm to 500 nm.

In the above configuration, the waveband selecting filters 112, 113, and 114 are synchronously rotated at a high speed one another. That is, when the red light is selected by the waveband selecting filter 112, the red light is selected by the other waveband selecting filters 113, 114. In the same manner, the green light and the blue light are respectively selected by the filters 112, 113 and 114 at the same time. In addition, the selection in the filters is implemented in the order of the red light, the green light and the blue light.

Therefore, when the red light is selected by the waveband selecting filters 112, 113, and 114, the subject 56 is illuminated with the red light passing through the filter 112 before the light modulator 30 is irradiated with the red light. Therefore, the image of the subject 56 is written in the light modulator 30 according to the intensity distribution of large pieces of red writing light. At the same time, a background of the subject 56 is illuminated with the red light selected by the filter 113 in synchronism with the filter 112, if necessary. Thereafter, a background image of the subject 56 is written in the light modulator 30.

Thereafter, the image of the subject 56 is read out by the red light selected by the filter 114 in synchronism with the filter 112 before the image of the subject 56 is projected onto the screen 23 by the red light. In this case, the background image of the subject 56 is simultaneously projected by the red light.

In the same manner, after the image of the subject 56 is projected by the red light, the green light is sequentially selected by the filters 112, 113 and 114. Therefore, the subject 56 is illuminated with the green light selected by the filter 112 before the image of the subject 56 is written in the light modulator 30. Thereafter, the image of the subject 56 is read out by the green light selected by the filter 114 in synchronism with the filter 112 before the image of the subject 56 is projected onto the screen 23 by the green reading light. In this case, the background image of the subject 56 is simultaneously projected by the green reading light.

Thereafter, the blue light is sequentially selected by the filters 112, 113 and 114. Therefore, the image of the subject 56 is projected onto the screen 23 by the blue light in the same manner.

Accordingly, because three monochromatic images of the subject 56 are sequentially projected at a high speed one after another by the three primary color lights such as the red, green and blue light, an audience can regard the image of the subject 56 as a colored image according to an after-image phenomenon. In the same manner, the audience can regard the background image as a colored background image.

In the seventh embodiment, although the waveband selecting filters 112, 113 and 114 are utilized to sequentially change the three primary color lights one after another, it is preferred that the light sources 27, 34 and 57 sequentially generate three primary color lights one after another without any waveband selecting filter. Specifically, the light sources 27, 34 and 57 are respectively formed by a red-green-blue (RGB) white laser source in which three types of monochromatic light sources are united, and the white laser source is operated to generate three types of monochromatic light one after another.

The present invention is not limited by the first to seventh embodiments. That is, it is preferred that the optical systems 28, 32, 36, 38, 61 and 88 comprise many types of optical devices such as a light converging mechanism. Especially, an auto focus mechanism is preferable as one of the light converging mechanisms.

In addition, it is preferred that the light modulating layer 48, 108R, 108G or 108B be formed by a modulating material with a memory property such as electro-optics crystal, lead lanthanum zirconate titanate (PLZT), ferroelectric liquid crystal, and the like. In the above configuration, the light modulating layer keeps storing the image information written in the photoconductive layer until the image information written in the photoconductive layer is renewed to new image information. In other words, the image information keeps being reproduced onto the screen 23, even though the writing light is turned off to stop illuminating the manuscript after the image information is written in the photoconductive layer. Therefore, the consumption of the electric power can be reduced.

In addition, in cases where the manuscript film 25 is illuminated with the writing light from above the manuscript film 25, the writing light directly reaches an audience. Therefore, the audience cannot clearly see the image onto the screen 23. However, in cases where the writing light is turned off after the image information is written in the photoconductive layer, the audience can clearly see the image onto the screen 23 without being disturbed by the writing light.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An overhead projector for projecting a subject image of a subject onto a screen with reading light, comprising:

writing light generating means for generating writing light, the subject being illuminated with the writing light;

a spatial light modulator for storing the subject image which is written with the writing light generated in the writing light generating means, the spatial light modulator comprising image reproducing means for receiving the writing light coming from the subject to reproduce the subject image, light modulating means formed by a liquid crystal for modulating the reading light according to the subject image reproduced in the image reproducing means, and a mirror for reflecting the reading light modulated by the light modulating means, the reading light reflected by the mirror being projected onto the screen; and optical system means for illuminating the subject with the writing light generated in the writing light generating means to form the subject image and irradiating the image reproducing means of the spatial light modulator with the writing light coming from the subject to write the subject image in the image reproducing means, the optical system means including focus adjusting means for adjusting a focus of the optical system means to compensate for a thickness of the subject.

2. An overhead projector according to claim 1 in which molecules of the liquid crystal forming the light modulating means are arranged in a homeotropic orientation.

3. An overhead projector for projecting a subject image of a subject onto a screen with reading light, comprising:
  writing light generating means for generating writing light, the subject being illuminated with the writing light;
  a spatial light modulator for storing the subject image which is written with the writing light generated in the writing light generating means, the spatial light modulator comprising
  image reproducing means for receiving the writing light coming from the subject to reproduce the subject image,
  light modulating means formed by a liquid crystal for modulating the reading light according to the subject image reproduced in the image reproducing means, and
  a mirror for reflecting the reading light modulated by the light modulating means, the reading light reflected by the mirror being projected onto the screen;
  optical system means for illuminating the subject with the writing light generated in the writing light generating means to form the subject image and irradiating the image reproducing means of the spatial light modulator with the writing light coming from the subject to write the subject image in the image reproducing means;
  light adjusting means for adjusting intensity of the writing light generated in the writing light generating means according to density of the subject; and
  sensitivity adjusting means for adjusting sensitivity of the image reproducing means of the spatial light modulator according to the intensity of the writing light adjusted in the light adjusting means.

4. An overhead projector according to claim 3 in which molecules of the liquid crystal forming the light modulating means are arranged in a homeotropic orientation.

5. An overhead projector for projecting a subject image of a subject onto a screen with reading light, comprising:
  writing light generating means for generating writing light, the subject being illuminated with the writing light;
  spatial light modulator for storing the subject image which is written with the writing light generated in the writing light generating means, the spatial light modulator comprising
  image reproducing means for receiving the writing light coming from the subject to reproduce the subject image,
  light modulating means formed by a liquid crystal for modulating the reading light according to the subject image reproduced in the image reproducing means, and
  a mirror for reflecting the reading light modulated by the light modulating means, the reading light reflected by the mirror being projected onto the screen;
  optical system means for illuminating the subject drawn in a transparent manuscript with the writing light generated in the writing light generating means to form the subject image and irradiating the image reproducing means of the spatial light modulator with the writing light penetrating the transparent manuscript to write the subject image in the image reproducing means;
  light adjusting means for adjusting intensity of the writing light generated in the writing light generating means according to density of the subject; and
  sensitivity adjusting means for adjusting sensitivity of the image reproducing means of the spatial light modulator according to the intensity of the writing light adjusted in the light adjusting means.

6. An overhead projector according to claim 5 in which molecules of the liquid crystal forming the light modulating means are arranged in a homeotropic orientation.

7. An overhead projector for projecting a subject image of a subject onto a screen, comprising:
  source light generating means for generating source light;
  waveband limiting means for limiting the waveband of the source light generated in the source light generating means within a prescribed range;
  light splitting means for splitting the source light of which the waveband are limited by the waveband limiting means into two beams consisting of a beam of perpendicularly polarized light to the place of incidence and a beam of parallel polarized light to the place of incidence;
  optical system means for illuminating the subject with one of the two beams splitted in the light splitting means to form the subject image; and
  a spatial light modulator for storing the subject image formed by illuminating the subject in the optical system means, the spatial light modulator comprising
  image reproducing means for receiving the one of the two beams coming from the subject illuminated in the optical system means to reproduce the subject image,
  light modulating means formed by a liquid crystal for modulating the other beam, which is splitted in the light splitting means and does not illuminate the subject, according to the subject image reproduced in the image reproducing means, and
  a mirror for reflecting the other beam modulated in the light modulating means, the other beam reflected by the mirror being projected onto the screen.

8. An overhead projector according to claim 7 in which molecules of liquid crystal forming the light modulating means are arranged in a homeotropic orientation.

9. An overhead projector according to claim 7 further comprising:
  base stand means for accommodating the source light generating means and the waveband limiting means;
  projecting head means arranged above the base stand means for accommodating the light splitting means, the optical system means and the spatial light modulator; and
  transmitting means for transmitting the source light of which the waveband is limited by the waveband limiting means from the base band means to the image reproducing means of the spatial light modulator accommodated in the projecting head means.

10. An overhead projector according to claim 7 in which the optical system means comprises intensity adjusting means for adjusting intensity of the one of the two beams of the source light with a polarizer, the subject being irradiated with the one of the two beams of the source light of which the intensity is adjusted by the intensity adjusting means.

11. An overhead projector for projecting a subject image of a subject onto a screen with reading light, comprising:
- a transparent subject stand for putting the subject drawn in a transparent film;
- flat light generating means arranged just under the transparent subject stand for generating flat light, the flat light penetrating the transparent film put on the transparent subject stand to form the subject image of the subject;
- light adjusting means for adjusting intensity of the flat light generated by the flat light generating means; and
- a spatial light modulator for storing the subject image formed by illuminating the subject with the flat light of which the intensity is adjusted in the light adjusting means, the spatial light modulator comprising
- image reproducing means for receiving the flat light penetrating the subject to reproduce the subject image,
- light modulating means formed by a liquid crystal for modulating the reading light according to the subject image reproduced in the image reproducing means, and
- a mirror for reflecting the reading light modulated by the light modulating means, the reading light reflected by the mirror being projected onto the screen.

12. An overhead projector according to claim 11 in which molecules of the liquid crystal forming the light modulating means are arranged in a homeotropic orientation.

13. An overhead projector for projecting a subject image of a subject onto a screen with reading light, comprising:
- writing light generating means for sequentially generating three primary color lights one after another in prescribed order, each of the three primary color lights being utilized as writing light;
- first optical system means for sequentially illuminating the subject with the three primary color lights of the writing light generated by the writing light generating means one after another in the prescribed order, the subject image being formed by the illumination of the subject with each of the three primary color lights;
- reading light generating means for sequentially generating three primary color lights one after another in the prescribed order in synchronism with the writing light generating means, each of the three primary color lights being utilized as the reading light;
- a spatial light modulator for storing the subject image formed in the first optical system means, the spatial light modulator comprising
- image reproducing means for receiving the writing light coming from the subject to reproduce the subject image,
- light modulating means formed by a liquid crystal for modulating the reading light generated in the reading light generating means according to the subject image reproduced in the image reproducing means, and
- a mirror for reflecting the reading light modulated by the light modulating means; and
- second optical system means for sequentially irradiating the light modulating means with the three primary color lights of the reading light generated by the reading light generating means one after another in the prescribed order to read out the subject image and projecting the reading light reflected by the mirror onto the screen.

14. An overhead projector according to claim 13 in which molecules of the liquid crystal forming the light modulating means are arranged in a homeotropic orientation.

15. An overhead projector according to claim 13 in which the writing light generating means and the reading light generating means respectively comprise a light source for generating source light of which a waveband ranges over the three primary color lights and a rotatory disk divided into sectorial regions for sequentially passing the three primary color lights one after another.

* * * * *